(12) United States Patent
Sasaki et al.

(10) Patent No.: US 11,899,316 B2
(45) Date of Patent: Feb. 13, 2024

(54) TERAHERTZ WAVE CONTROL ELEMENT

(71) Applicants: NAGAOKA UNIVERSITY OF TECHNOLOGY, Nagaoka (JP); UNIVERSITY OF HYOGO, Kobe (JP); NISSAN CHEMICAL CORPORATION, Chuo-ku (JP)

(72) Inventors: Tomoyuki Sasaki, Nagaoka (JP); Hiroshi Ono, Nagaoka (JP); Nobuhiro Kawatsuki, Himeji (JP); Kohei Goto, Funabashi (JP); Kimiaki Tsutsui, Funabashi (JP)

(73) Assignees: NAGAOKA UNIVERSITY OF TECHNOLOGY, Nagaoka (JP); UNIVERSITY OF HYOGO, Kobe (JP); NISSAN CHEMICAL CORPORATION, Chuo-ku (JP)

( * ) Notice: Subject to any disclaimer, the term of this patent is extended or adjusted under 35 U.S.C. 154(b) by 38 days.

(21) Appl. No.: 17/789,278

(22) PCT Filed: Dec. 25, 2020

(86) PCT No.: PCT/JP2020/048663
§ 371 (c)(1),
(2) Date: Jun. 27, 2022

(87) PCT Pub. No.: WO2021/132549
PCT Pub. Date: Jul. 1, 2021

(65) Prior Publication Data
US 2023/0093066 A1    Mar. 23, 2023

(30) Foreign Application Priority Data
Dec. 27, 2019 (JP) .................................. 2019-237772

(51) Int. Cl.
*G02F 1/1337* (2006.01)
*G02F 1/01* (2006.01)

(52) U.S. Cl.
CPC .......... *G02F 1/1337* (2013.01); *G02F 1/0102* (2013.01); *G02F 2203/06* (2013.01); *G02F 2203/13* (2013.01)

(58) Field of Classification Search
CPC ........................ G02F 2203/13; G02F 2203/06
See application file for complete search history.

(56) References Cited

U.S. PATENT DOCUMENTS

| | | | | |
|---|---|---|---|---|
| 2001/0037000 A1* | 11/2001 | Goto | ...................... | C08G 61/12 525/291 |
| 2002/0172850 A1* | 11/2002 | Asano | .................. | B01D 69/141 429/316 |
| 2010/0093117 A1* | 4/2010 | Jiang | ...................... | G06F 3/045 257/E33.053 |

OTHER PUBLICATIONS

Tomoyuki Sasaki, et al., "Liquid crystal cells with subwavelength metallic gratings for transmissive terahertz elements with electrical tunability," Optics Communications, vol. 431, Jan. 15, 2019, 6 pages.

(Continued)

*Primary Examiner* — Lauren Nguyen
(74) *Attorney, Agent, or Firm* — Oblon, McClelland, Maier & Neustadt, L.L.P.

(57) ABSTRACT

The present invention provides a polarization-independent terahertz wave control element, and provides a method for manufacturing a polarization-independent terahertz wave control element. The present invention provides a terahertz wave control element comprising: (A) a first flat plate having (A1) a first substrate, (A2) a first electrode formed on the first substrate, and (A3) a first liquid crystal alignment film formed on the first electrode; (B) a second flat plate (Continued)

having (B1) a second substrate, (B2) a second electrode formed on the second substrate, and (B3) a second liquid crystal alignment film formed on the second electrode; and (C) a liquid crystal present in a space formed by disposing (A) the first flat plate and (B) the second flat plate parallel to each other with a predetermined distance therebetween so that the first and second liquid crystal alignment films face each other, wherein (D1) the terahertz wave control element has a first portion in which the liquid crystal is aligned in a first direction parallel to (A) the first flat plate and (B) the second flat plate, and a second portion in which the liquid crystal is aligned in a second direction orthogonal to the first direction and parallel to (A) the first flat plate and (B) the second flat plate when no voltage is applied, (D2) the first portion has a first width, the second portion has a second width, the first and second portions are disposed adjacent to each other and alternately disposed in a predetermined cycle, (D3) when voltage is applied, the liquid crystal in each of the first portion and the second portion is aligned in a direction orthogonal to (A) the first substrate and (B) the second substrate, and (E) a phase change in which a terahertz wave transmitted through the terahertz wave control element is independent of the state of polarization.

13 Claims, 4 Drawing Sheets

(56) References Cited

OTHER PUBLICATIONS

Anup Kumar Sahoo, et al., "Twisted Nematic Liquid-Crystal-Based Terahertz Phase Shifter using Pristine PEDOT: PSS Transparent Conducting Electrodes," Applied Sciences, vol. 9, No. 761, 2019, 13 pages.

Tomoyuki Sasaki, et al., "Universal polarization terahertz phase controllers using randomly aligned liquid crystal cells with graphene electrodes," Optics Letters, vol. 40, No. 7, Apr. 1, 2015, pp. 1544-1547.

* cited by examiner

Filing rate

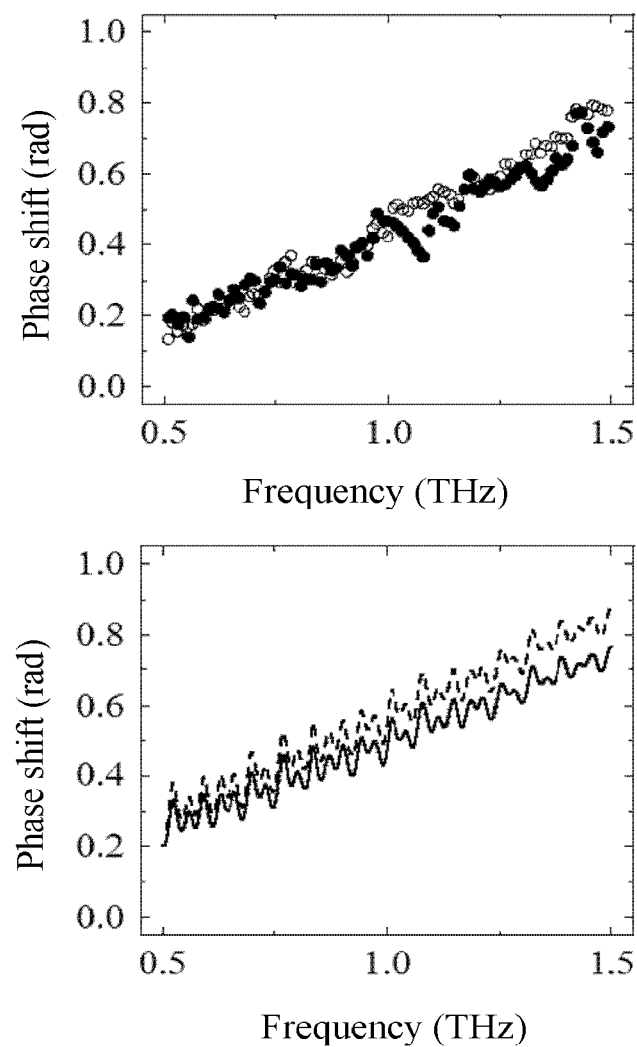

TERAHERTZ WAVE CONTROL ELEMENT

This application is a national stage application of PCT/JP2020/048663, filed Dec. 25, 2020, claiming priority to Japanese Patent application No. 2019-237772, filed Dec. 27, 2019. The contents of both applications are incorporated herein in their entirety.

TECHNICAL FIELD

The present invention relates to a terahertz wave control element. In particular, the present invention relates to a polarization-independent terahertz wave control element, in particular, a polarization-independent terahertz wave control element using a liquid crystal.

Further, the present invention relates to a method for producing the terahertz wave control element, in particular, a method for producing the polarization-independent terahertz wave control element, in particular, a method for producing the polarization-independent terahertz wave control element using a liquid crystal.

BACKGROUND ART

An electromagnetic wave in a terahertz band (0.1 THz to 10 THz) (hereinafter, referred to as a terahertz wave) is expected to have useful applications in many fields such as information communication, physical chemistry, biological observation, biodiagnostics, non-destructive inspection, environmental measurement, security and the like. The terahertz wave corresponds to an intermediate band between an optical wave and a radio wave, and has a longer wavelength and a wider band than a laser beam. Thus, an optical element used in a conventional laser beam cannot be used for the terahertz wave. Therefore, in order to realize and spread the above-described useful applications using the terahertz wave, it is required to develop a technology for highly controlling propagation of the terahertz wave.

For example, studies on a dynamic terahertz element using a liquid crystal have been reported as studies on an element that highly controls propagation of the terahertz wave and a material therefor. It is disclosed that a basic element such as a phase shifter or a wave plate can be realized by a liquid crystal (for example, Non-Patent Document 1 or Non-Patent Document 2). However, most of these liquid crystal terahertz elements operate using refractive index anisotropy of the liquid crystal, and the characteristics thereof depend on a polarization state of an incident wave in principle.

On the other hand, a polarization-independent element is also required. In this regard, those who partially overlap with the inventors of the present application have developed a phase shifter using randomly aligned liquid crystal cells in which a domain size of a random alignment is set to about a sub-wavelength and a phase thereof is independent on the polarization (Non-Patent Document 3). However, the phase shifter has a problem in that an increase in scattering loss due to a domain structure is concerned, a problem in that it is technically difficult to intentionally control the domain size of the random alignment, and the like. It is required to development a polarization-independent terahertz element, in particular, a liquid crystal terahertz element without these problems.

PRIOR ART DOCUMENT

Non-Patent Document

[Non-Patent Document 1] T. Sasaki, H. Kushida, M. Sakamoto, K. Noda, H. Okamoto, N. Kawatsuki, H. Ono, Opt. Comuun. 431, 63 (2019).

[Non-Patent Document 2] Anup Kumar Sahoo, Chan-Shan Yang, Chun-Ling Yen, Hung-Chun Lin, Yu-JenWang, Yi-Hsin Lin, Osamu Wada, Ci-Ling Pan, Appl. Sci. 9, 761 (2019).

[Non-Patent Document 3] T. Sasaki. K. Noda, N. Kawatsuki, H. Ono, Opt. Lett. 40, 1544 (2015).

DISCLOSURE OF THE INVENTION

Problems to be Solved by the Invention

An object of the present invention is to provide a polarization-independent terahertz wave control element, in particular, a polarization-independent terahertz wave control element using a liquid crystal.

Further, other than the above objects, an object of the present invention is to provide a method for producing the polarization-independent terahertz wave control element, in particular, a method for producing the polarization-independent terahertz wave control element using a liquid crystal.

Means for Solving Problems

The present inventors have found the following inventions:

<1> A terahertz wave control element comprising:
(A) a first flat plate comprising:
(A1) a first substrate capable of transmitting a terahertz wave;
(A2) a first electrode capable of transmitting a terahertz wave, formed on the first substrate; and
(A3) a first liquid crystal alignment film capable of transmitting a terahertz wave, formed on the first electrode;
(B) a second flat plate comprising:
(B1) a second substrate capable of transmitting a terahertz wave;
(B2) a second electrode capable of transmitting a terahertz wave, formed on the second substrate; and
(B3) a second liquid crystal alignment film capable of transmitting a terahertz wave, formed on the second electrode; and
(C) a liquid crystal located in a space formed by locating the (A) first flat plate and the (B) second flat plate to be parallel to each other with a predetermined distance therebetween so that the first and second liquid crystal alignment films are located to be opposite each other,
wherein (D1) when no voltage is applied, the terahertz wave control element has a first portion in which the liquid crystal is aligned in a first direction parallel to the (A) first flat plate and the (B) second flat plate, and a second portion in which the liquid crystal is aligned in a second direction orthogonal to the first direction and parallel to the (A) first flat plate and the (B) second flat plate,
(D2) the first portion has a first width, the second portion has a second width, and the first and second portions are disposed adjacent to each other and alternately disposed in a predetermined cycle,
(D3) when a voltage is applied, the liquid crystal in each of the first portion and the second portion is aligned in a direction orthogonal to the (A) first flat plate and the (B) second flat plate, and
(E) a terahertz wave transmitted through the terahertz wave control element results in a phase change independent on a state of polarization.

<2> In the above item <1>, the first direction may have a direction parallel to a width direction of the first width.

<3> In the above item <2>, a ratio of the first width w1 to the predetermined cycle Λ, w1/Λ, may be from 0.45 to 0.55, preferably from 0.49 to 0.53, more preferably from 0.51 to 0.53, most preferably from 0.523 to 0.524.

<4> In any one of the above items <1> to <3>, the predetermined distance d with which the (A) first flat plate and the (B) second flat plate are located may be from 0.1 mm to 2.0 mm, preferably from 0.2 mm to 2.0 mm, more preferably from 1.0 mm to 2.0 mm.

<5> In any one of the above items <1> to <4>, each of the first and second liquid crystal alignment films may be independently comprised of a photoreactive polymer having a photoreactive side chain that causes at least one reaction selected from the group consisting of (A-1) photocrosslinking and (A-2) photoisomerization.

<6> In the above item <5>, the photoreactive polymer may comprise any one photoreactive side chain selected from the group consisting of the following formulae (1) to (6):

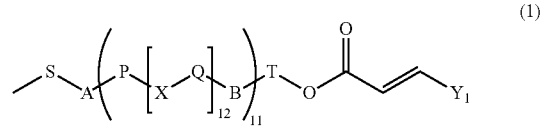

(1)

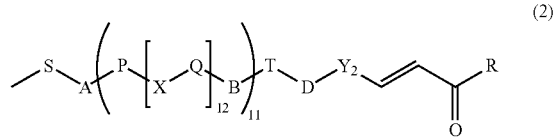

(2)

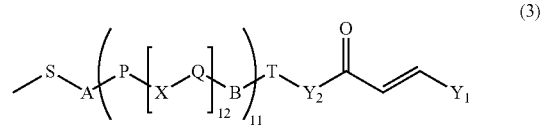

(3)

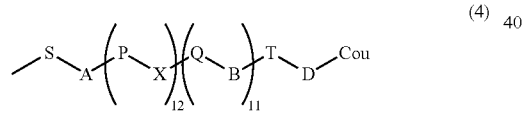

(4)

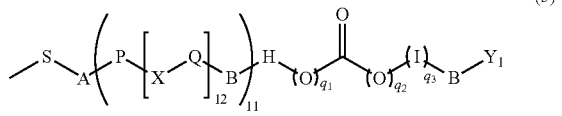

(5)

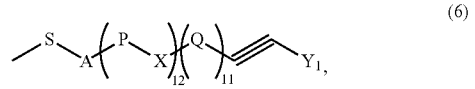

(6)

wherein A, B, and D each independently represents a single bond, —O—, —CH$_2$—, —COO—, —OCO—, —CONH—, —NH—CO—, —CH=CH—CO—O—, or —O—CO—CH=CH—;

S represents an alkylene group having 1 to 12 carbon atoms, wherein a hydrogen atom bonded thereto may be replaced with a halogen group;

T represents a single bond or an alkylene group having 1 to 12 carbon atoms, wherein a hydrogen atom bonded thereto may be replaced with a halogen group;

$Y_1$ represents a ring selected from a monovalent benzene ring, a monovalent naphthalene ring, a monovalent biphenyl ring, a monovalent furan ring, a monovalent pyrrole ring and a monovalent alicyclic hydrocarbon having 5 to 8 carbon atoms, or a group in which the same or different two to six rings selected therefrom are bonded through a bonding group B, wherein a hydrogen atom bonded thereto may be each independently replaced with —COOR$_0$ (wherein R$_0$ represents a hydrogen atom or an alkyl group having 1 to 5 carbon atoms), —NO$_2$, —CN, —CH=C(CN)$_2$, —CH=CH—CN, a halogen group, an alkyl group having 1 to 5 carbon atoms, or an alkyloxy group having 1 to 5 carbon atoms;

$Y_2$ represents a group selected from the group consisting of a bivalent benzene ring, a bivalent naphthalene ring, a bivalent biphenyl ring, a bivalent furan ring, a bivalent pyrrole ring, a bivalent alicyclic hydrocarbon having 5 to 8 carbon atoms and a combination thereof, wherein a hydrogen atom bonded thereto may be each independently replaced with —NO$_2$, —CN, —CH=C(CN)$_2$, —CH=CH—CN, a halogen group, an alkyl group having 1 to 5 carbon atoms, or an alkyloxy group having 1 to 5 carbon atoms;

R represents a hydroxy group, an alkoxy group having 1 to 6 carbon atoms, or has the same definition as $Y_1$;

X represents a single bond, —COO—, —OCO—, —N=N—, —CH=CH—, —C≡C—, —CH=CH—CO—O—, or —O—CO—CH=CH—, and in a case where the number of X is 2, these Xs may be the same or different;

Cou represents a coumarin-6-yl group or a coumarin-7-yl group, wherein a hydrogen atom bonded thereto may be each independently replaced with —NO$_2$, —CN, —CH=C (CN)$_2$, —CH=CH—CN, a halogen group, an alkyl group having 1 to 5 carbon atoms, or an alkyloxy group having 1 to 5 carbon atoms;

one of q1 and q2 is 1, and another is 0;

q3 is 0 or 1;

P and Q each independently represents a group selected from the group consisting of a bivalent benzene ring, a bivalent naphthalene ring, a bivalent biphenyl ring, a bivalent furan ring, a bivalent pyrrole ring, a bivalent alicyclic hydrocarbon having 5 to 8 carbon atoms and a combination thereof, in proviso that in a case where X is —CH=CH—CO—O— or —O—CO—CH=CH—, P or Q on a side to which —CH=CH— is bonded is an aromatic ring, in a case where the number of P is 2 or more, these Ps may be the same or different, and in a case where the number of Q is 2 or more, these Qs may be the same or different;

l1 represents 0 or 1;

l2 represents an integer of 0 to 2;

in a case where both l1 and l2 are 0 and T is a single bond, A also represents a single bond;

in a case where l1 is 1 and T is a single bond, B also represents a single bond; and H and I each independently represents a group selected from a bivalent benzene ring, a bivalent naphthalene ring, a bivalent biphenyl ring, a bivalent furan ring, a bivalent pyrrole ring and a combination thereof.

<7> In the above item <5> or <6>, the photoreactive polymer may comprise any one photoreactive side chain selected from the group consisting of the following formulae (7) to (10):

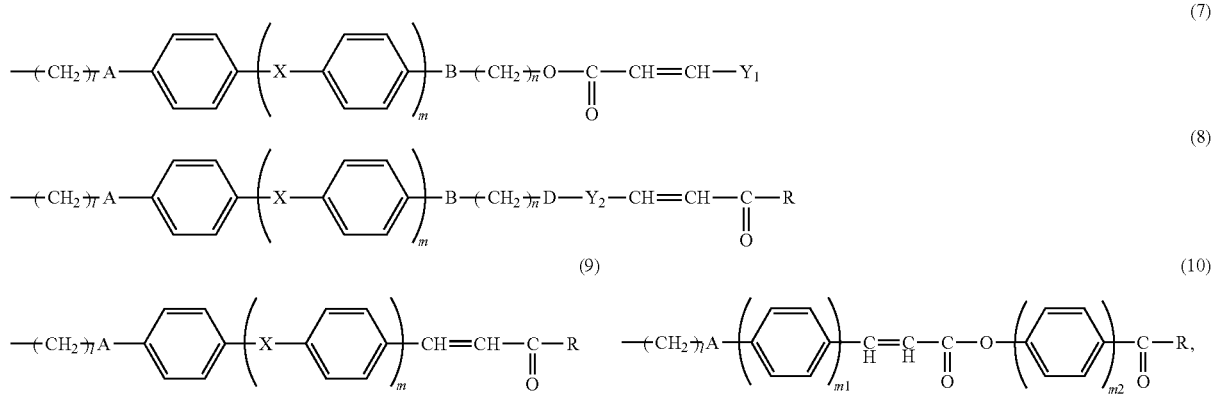

(7)

(8)

(9)

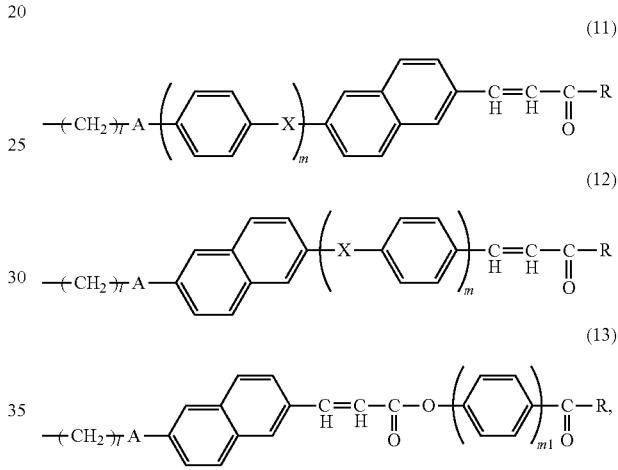

(10)

(11)

(12)

(13)

wherein A, B, and D each independently represents a single bond, —O—, —$CH_2$—, —COO—, —OCO—, —CONH—, —NH—CO—, —CH=CH—CO—O—, or —O—CO—CH=CH—;

$Y_1$ represents a ring selected from a monovalent benzene ring, a monovalent naphthalene ring, a monovalent biphenyl ring, a monovalent furan ring, a monovalent pyrrole ring and a monovalent alicyclic hydrocarbon having 5 to 8 carbon atoms, or a group in which the same or different two to six rings selected therefrom are bonded through a bonding group B, wherein a hydrogen atom bonded thereto may be each independently replaced with —$COOR_0$ (wherein $R_0$ represents a hydrogen atom or an alkyl group having 1 to 5 carbon atoms), —$NO_2$, —CN, —CH=$C(CN)_2$, —CH=CH—CN, a halogen group, an alkyl group having 1 to 5 carbon atoms, or an alkyloxy group having 1 to 5 carbon atoms;

X represents a single bond, —COO—, —OCO—, —N=N—, —CH=CH—, —C≡C—, —CH=CH—CO—O—, or —O—CO—CH=CH—, and in a case where the number of X is 2, these Xs may be the same or different;

l represents an integer of 1 to 12;

m represents an integer of 0 to 2, and each of m1 and m2 represents an integer of 1 to 3;

n represents an integer of 0 to 12 (when n=0, B represents a single bond);

$Y_2$ represents a group selected from the group consisting of a bivalent benzene ring, a bivalent naphthalene ring, a bivalent biphenyl ring, a bivalent furan ring, a bivalent pyrrole ring, a bivalent alicyclic hydrocarbon having 5 to 8 carbon atoms and a combination thereof, wherein a hydrogen atom bonded thereto may be each independently replaced with —$NO_2$, —CN, —CH=$C(CN)_2$, —CH=CH—CN, a halogen group, an alkyl group having 1 to 5 carbon atoms, or an alkyloxy group having 1 to 5 carbon atoms; and R represents a hydroxy group, an alkoxy group having 1 to 6 carbon atoms, or has the same definition as $Y_1$.

<8> In any one of the above items <5> to <7>, the photoreactive polymer may comprise any one photoreactive side chain selected from the group consisting of the following formulae (11) to (13):

wherein A independently represents a single bond, —O—, —$CH_2$—, —COO—, —OCO—, —CONH—, —NH—CO—, —CH=CH—CO—O—, or —O—CO—CH=CH—;

X represents a single bond, —COO—, —OCO—, —N=N—, —CH=CH—, —C≡C—, —CH=CH—CO—O—, or —O—CO—CH=CH—, and in a case where the number of X is 2, these Xs may be the same or different;

l represents an integer of 1 to 12, m represents an integer of 0 to 2, and m1 represents an integer of 1 to 3; and R represents a ring selected from a monovalent benzene ring, a monovalent naphthalene ring, a monovalent biphenyl ring, a monovalent furan ring, a monovalent pyrrole ring and a monovalent alicyclic hydrocarbon having 5 to 8 carbon atoms, or a group in which the same or different two to six rings selected therefrom are bonded through a bonding group B, wherein a hydrogen atom bonded thereto may be each independently replaced with —$COOR_0$ (wherein $R_0$ represents a hydrogen atom or an alkyl group having 1 to 5 carbon atoms), —$NO_2$, —CN, —CH=$C(CN)_2$, —CH=CH—CN, a halogen group, an alkyl group having 1 to 5 carbon atoms, or an alkyloxy group having 1 to 5 carbon atoms, a hydroxy group, or an alkoxy group having 1 to 6 carbon atoms.

<9> In any one of the above items <5> to <8>, the photoreactive polymer may comprise a photoreactive side chain represented by the following formula (14) or (15):

(14)

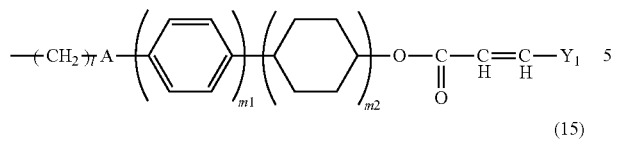

(15)

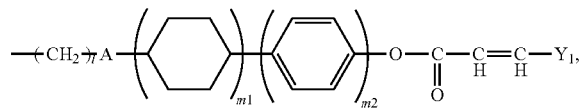

(18)

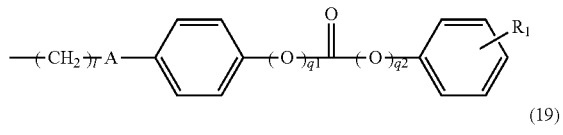

(19)

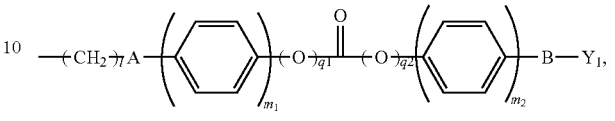

wherein A represents a single bond, —O—, —CH$_2$—, —COO—, —OCO—, —CONH—, —NH—CO—, —CH=CH—CO—O—, or —O—CO—CH=CH—;

Y$_1$ represents a ring selected from a monovalent benzene ring, a monovalent naphthalene ring, a monovalent biphenyl ring, a monovalent furan ring, a monovalent pyrrole ring and a monovalent alicyclic hydrocarbon having 5 to 8 carbon atoms, or a group in which the same or different two to six rings selected therefrom are bonded through a bonding group B, wherein a hydrogen atom bonded thereto may be each independently replaced with —COOR$_0$ (wherein R$_0$ represents a hydrogen atom or an alkyl group having 1 to 5 carbon atoms), —NO$_2$, —CN, —CH=C(CN)$_2$, —CH=CH—CN, a halogen group, an alkyl group having 1 to 5 carbon atoms, or an alkyloxy group having 1 to 5 carbon atoms;

l represents an integer of 1 to 12, and each of m1 and m2 represents an integer of 1 to 3.

<10> In any one of the above items <5> to <9>, the photoreactive polymer may comprise a photoreactive side chain represented by the following formula (16) or (17):

(16)

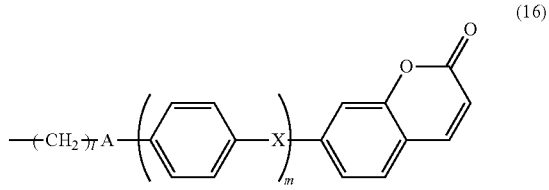

(17)

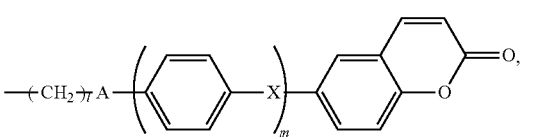

wherein A represents a single bond, —O—, —CH$_2$—, —COO—, —OCO—, —CONH—, —NH—CO—, —CH=CH—CO—O—, or —O—CO—CH=CH—;

X represents a single bond, —COO—, —OCO—, —N=N—, —CH=CH—, —C≡C—, —CH=CH—CO—O—, or —O—CO—CH=CH—, and in a case where the number of X is 2, these Xs may be the same or different; and l represents an integer of 1 to 12, and m represents an integer of 0 to 2.

<11> In any one of the above items <5> to <10>, the photoreactive polymer may comprise a photoreactive side chain represented by the following formula (18) or (19):

wherein A and B each independently represents a single bond, —O—, —CH$_2$—, —COO—, —OCO—, —CONH—, —NH—CO—, —CH=CH—CO—O—, or —O—CO—CH=CH—;

Y$_1$ represents a ring selected from a monovalent benzene ring, a monovalent naphthalene ring, a monovalent biphenyl ring, a monovalent furan ring, a monovalent pyrrole ring and a monovalent alicyclic hydrocarbon having 5 to 8 carbon atoms, or a group in which the same or different two to six rings selected therefrom are bonded through a bonding group B, wherein a hydrogen atom bonded thereto may be each independently replaced with —COOR$_0$ (wherein R$_0$ represents a hydrogen atom or an alkyl group having 1 to 5 carbon atoms), —NO$_2$, —CN, —CH=C(CN)$_2$, —CH=CH—CN, a halogen group, an alkyl group having 1 to 5 carbon atoms, or an alkyloxy group having 1 to 5 carbon atoms;

one of q1 and q2 is 1, and another is 0;

l represents an integer of 1 to 12, and each of m1 and m2 represents an integer of 1 to 3;

R$_1$ represents a hydrogen atom, —NO$_2$, —CN, —CH=C(CN)$_2$, —CH=CH—CN, a halogen group, an alkyl group having 1 to 5 carbon atoms, or an alkyloxy group having 1 to 5 carbon atoms.

<12> In any one of the above items <5> to <11>, the photoreactive polymer may comprise a photoreactive side chain represented by the following formula (20):

(20)

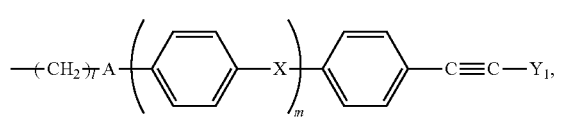

wherein A represents a single bond, —O—, —CH$_2$—, —COO—, —OCO—, —CONH—, —NH—CO—, —CH=CH—CO—O—, or —O—CO—CH=CH—;

Y$_1$ represents a ring selected from a monovalent benzene ring, a monovalent naphthalene ring, a monovalent biphenyl ring, a monovalent furan ring, a monovalent pyrrole ring and a monovalent alicyclic hydrocarbon having 5 to 8 carbon atoms, or a group in which the same or different two to six rings selected therefrom are bonded through a bonding group B, wherein a hydrogen atom bonded thereto may be each independently replaced with —COOR$_0$ (wherein R$_0$ represents a hydrogen atom or an alkyl group having 1 to 5 carbon atoms), —NO$_2$, —CN, —CH=C(CN)$_2$, —CH=CH—CN, a halogen group, an alkyl group having 1 to 5 carbon atoms, or an alkyloxy group having 1 to 5 carbon atoms;

X represents a single bond, —COO—, —OCO—, —N=N—, —CH=CH—, —C≡C—, —CH=CH—COO—, or —O—CO—CH=CH—, and in a case where the number of X is 2, these Xs may be the same or different; and l represents an integer of 1 to 12, and m represents an integer of 0 to 2.

<13> A method for producing a terahertz wave control element, comprising the step of:

(I) preparing a first substrate capable of transmitting a terahertz wave, the first substrate having one surface provided with a first electrode capable of transmitting a terahertz wave;

(II) preparing a first liquid crystal aligning agent comprising a photoreactive polymer having a photoreactive side chain that causes at least one reaction selected from the group consisting of (A-1) photocrosslinking and (A-2) photoisomerization;

(III) applying the first liquid crystal aligning agent on the first electrode of the first substrate, to form a first liquid crystal alignment film;

(IV) (i) a 1st light irradiation step: irradiating the first liquid crystal alignment film with a first polarized light through a photomask having a 1st region with a first width that transmits the first polarized light and a second region with a second width that does not transmit the first polarized light alternately in a predetermined cycle, to cause the reaction in the photoreactive polymer in a first portion corresponding to the first region of the first liquid crystal alignment film; and (ii) a 2nd light irradiation step: disposing the photomask so that a second portion different from the first portion in the 1st light irradiation step is formed as a region capable of transmitting a second polarized light orthogonal to the first polarized light, and irradiating the first liquid crystal alignment film with the second polarized light through the photomask to cause the reaction in the photoreactive polymer in the second portion of the first liquid crystal alignment film;

(V) performing heat treatment on the substrate obtained after the 1st and 2nd light irradiation steps, to obtain a first flat plate;

(I') preparing a second substrate capable of transmitting a terahertz wave, the second substrate having one surface provided with a second electrode capable of transmitting a terahertz wave;

(II') preparing a second liquid crystal aligning agent comprising a photoreactive polymer having a photoreactive side chain that causes at least one reaction selected from the group consisting of (A-1) photocrosslinking and (A-2) photoisomerization;

(III') applying the second liquid crystal aligning agent on the second electrode of the second substrate, to form a second liquid crystal alignment film;

(IV') (i') a 1'st light irradiation step: irradiating the second liquid crystal alignment film with a first polarized light through the photomask, to cause a reaction in the photoreactive polymer in a 1'st portion corresponding to the first region of the second liquid crystal alignment film; and (ii') a 2'nd light irradiation step: disposing the photomask so that a 2'nd portion different from the 1'st portion in the 1'st light irradiation step is formed as a region capable of transmitting a second polarized light orthogonal to the first polarized light, and irradiating the second liquid crystal alignment film with the second polarized light through the photomask to cause a reaction in the photoreactive polymer in the 2'nd portion of the second liquid crystal alignment film;

(V') performing heat treatment on the substrate obtained after the 1'st and 2'nd light irradiation steps, to obtain a second flat plate;

(VI) locating the first flat plate and the second flat plate in parallel with a predetermined distance therebetween so that the first and second liquid crystal alignment films are opposite to each other, the 1st portion of the first liquid crystal alignment film and the 1'st portion of the second liquid crystal alignment film are opposite to each other, and the 2nd portion of the first liquid crystal alignment film and the 2'nd portion of the second liquid crystal alignment film are opposite to each other, to provide a space between the first flat plate and the second flat plate; and (VII) filling the space with a liquid crystal;
thereby to obtain the terahertz wave control element.

Effects of the Invention

The present invention can provide a polarization-independent terahertz wave control element, in particular, a polarization-independent terahertz wave control element using a liquid crystal.

Further, other than the above effect, the present invention can provide a method for producing the polarization-independent terahertz wave control element, in particular, a method for producing the polarization-independent terahertz wave control element using a liquid crystal.

BRIEF DESCRIPTION OF DRAWINGS

FIG. 7 is a view illustrating measurement results and calculation results of a phase shift of the terahertz wave control element obtained by Examples when a sufficiently large voltage is applied.

EMBODIMENTS FOR CARRYING OUT THE INVENTION

Figure 1:
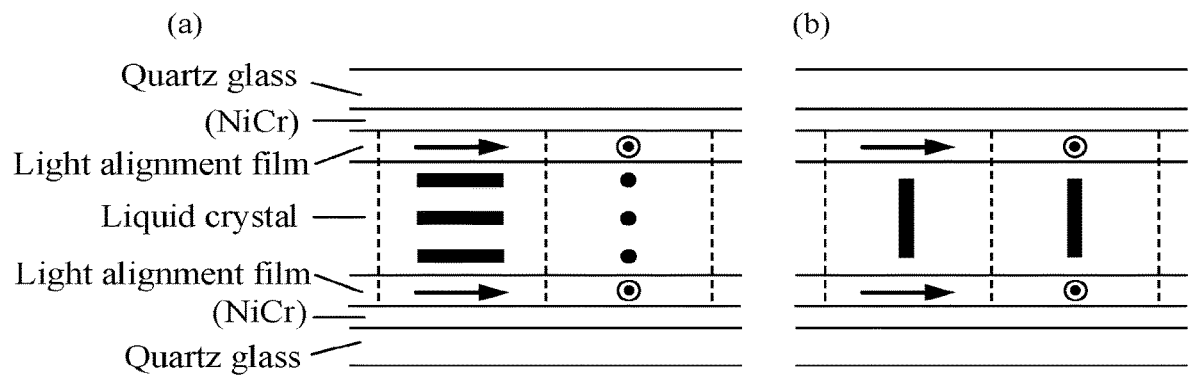
FIG. 1 is a schematic view illustrating a terahertz wave control element of the present invention.

The present application provides a terahertz wave control element and a method for producing the terahertz wave control element. Hereinafter, the terahertz wave control element and the method for producing the terahertz wave control element will be described in this order. Furthermore, common matters will be described in any of the terahertz wave control element and the method for producing the same.

<Terahertz Wave Control Element>

A terahertz wave control element of the present invention comprises:

(A) a first flat plate:
(B) a second flat plate that is the same as or different from the first flat plate; and
(C) a liquid crystal filled in a space formed by locating the (A) first flat plate and the (B) second flat plate to be parallel to each other with a predetermined distance therebetween.

The (A) first flat plate comprises:

(A1) a first substrate capable of transmitting a terahertz wave;
(A2) a first electrode capable of transmitting a terahertz wave, formed on the first substrate; and
(A3) a first liquid crystal alignment film capable of transmitting a terahertz wave, formed on the first electrode.

Further, the (B) second flat plate comprises:

(B1) a second substrate capable of transmitting a terahertz wave;
(B2) a second electrode capable of transmitting a terahertz wave, formed on the second substrate; and
(B3) a second liquid crystal alignment film capable of transmitting a terahertz wave, formed on the second electrode.

<<(A) First Flat Plate and (B) Second Flat Plate>>

The first and second substrates may be the same as or different from each other. Preferably, the first and second substrates may be the same as each other.

Materials of the first and second substrates are not particularly limited as long as a terahertz wave can be transmitted therethrough. Examples of the materials of the first and second substrates may include, but are not limited to, quartz glass; a Si wafer; and a polymer material such as polyethylene, polytetrafluoroethylene, polypropylene, polymethylpentene (TPX (registered trademark)), Tsurupica (registered trademark) or the like.

The first and second electrodes may be the same as or different from each other. Preferably, the first and second electrodes may be the same as each other.

Materials of the first and second electrodes are not particularly limited as long as a terahertz wave can be transmitted therethrough. Examples of the materials of the first and second electrodes may include, but are not limited to, NiCr; graphene; and a conductive polymer such as a polythiophene-based conductive polymer PEDOT/PSS, and the like.

The first and second liquid crystal alignment films may be the same as or different from each other. Preferably, the first and second liquid crystal alignment films may be the same as each other.

The first and second liquid crystal alignment films are not particularly limited as long as a terahertz wave can be transmitted therethrough and a liquid crystal is aligned in a desired direction.

It is preferable that the first and second liquid crystal alignment films each may independently have a photoreactive polymer having a photoreactive side chain that causes at least one reaction selected from the group consisting of (A-1) photocrosslinking and (A-2) photoisomerization.

Furthermore, a liquid crystal lattice to be described hereinafter can be produced by using a liquid crystal alignment film comprising a photoreactive polymer having a photoreactive side chain that causes the above reaction, and therefore, it is preferable to use a liquid crystal alignment film comprising a photoreactive polymer having a photoreactive side chain that causes the above reaction.

The photoreactive polymer is i) a polymer exhibiting liquid crystalline property in a predetermined temperature range and having a photoreactive side chain.

The photoreactive polymer ii) may react by light in a wavelength range of 250 nm to 450 nm and may exhibit liquid crystalline property in a temperature range of 50 to 300° C.

The photoreactive polymer iii) may preferably have a photoreactive side chain to react with light in a wavelength range of 250 nm to 450 nm, in particular, with a polarized ultraviolet ray.

The photoreactive polymer iv) may preferably have a mesogenic group in order to exhibit liquid crystalline property in a temperature range of 50 to 300° C.

As described above, the photoreactive polymer has a photoreactive side chain having photoreactivity. The structure of the side chain is not particularly limited, but causes a reaction indicated in the above (A-1) and/or (A-2), and preferably causes the (A-1) photocrosslinking reaction. A structure to cause the (A-1) photocrosslinking reaction is preferable because the structure after the reaction can hold orientation of the photoreactive polymer stably for a long time even when the structure after the reaction is exposed to an external stress such as heat.

The structure of the side chain of the photoreactive polymer may preferably comprise a rigid mesogenic component due to stable orientation of a liquid crystal.

Examples of the mesogenic component may include, but are not limited to, a biphenyl group, a terphenyl group, a phenyl cyclohexyl group, a phenyl benzoate group, an azobenzene group and the like.

The structure of a main chain of the photoreactive polymer, for example, may include, but is not limited to, at least one selected from the group consisting of radically polymerizable groups such as hydrocarbons, (meth)acrylates, itaconates, fumarates, maleates, α-methylene-γ-butyrolactones, styrenes, vinyl, maleimides and norbornenes, and siloxanes.

The photoreactive polymer may have any one photoreactive side chain selected from the group consisting of following formulae (1) to (6):

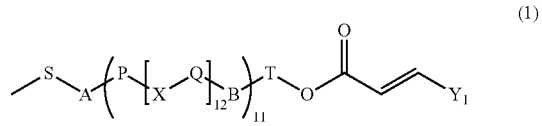

(1)

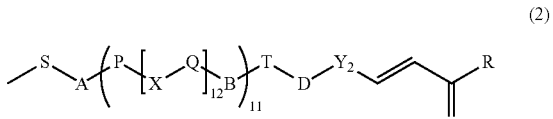

(2)

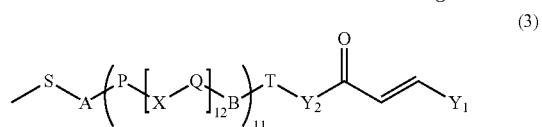

(3)

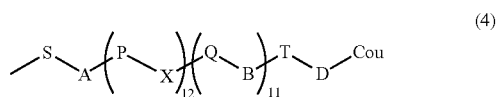

(4)

-continued

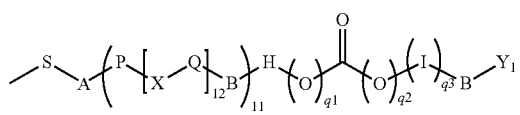
(5)

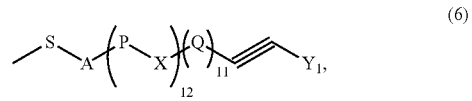
(6)

wherein A, B, and D each independently represents a single bond, —O—, —CH$_2$—, —COO—, —OCO—, —CONH—, —NH—CO—, —CH=CH—CO—O—, or —O—CO—CH=CH—;

S represents an alkylene group having 1 to 12 carbon atoms, wherein a hydrogen atom bonded thereto may be replaced with a halogen group;

T represents a single bond or an alkylene group having 1 to 12 carbon atoms, wherein a hydrogen atom bonded thereto may be replaced with a halogen group;

Y$_1$ represents a ring selected from a monovalent benzene ring, a monovalent naphthalene ring, a monovalent biphenyl ring, a monovalent furan ring, a monovalent pyrrole ring and a monovalent alicyclic hydrocarbon having 5 to 8 carbon atoms, or represents a group in which the same or different two to six rings selected therefrom are bonded through a bonding group B, wherein a hydrogen atom bonded thereto may be each independently replaced with —COOR$_0$ (wherein R$_0$ represents a hydrogen atom or an alkyl group having 1 to 5 carbon atoms), —NO$_2$, —CN, —CH=C(CN)$_2$, —CH=CH—CN, a halogen group, an alkyl group having 1 to 5 carbon atoms, or an alkyloxy group having 1 to 5 carbon atoms;

X represents a single bond, —COO—, —OCO—, —N=N—, —CH=CH—, —C≡C—, —CH=CH—COO—, or —O—CO—CH=CH—, and in a case where the number of X is 2, these Xs may be the same or different;

Cou represents a coumarin-6-yl group or a coumarin-7-yl group, wherein a hydrogen atom bonded thereto may be each independently replaced with —NO$_2$, —CN, —CH=C(CN)$_2$, —CH=CH—CN, a halogen group, an alkyl group having 1 to 5 carbon atoms, or an alkyloxy group having 1 to 5 carbon atoms;

one of q1 and q2 is 1, and another is 0;

q3 is 0 or 1;

P and Q each independently represents a group selected from the group consisting of a bivalent benzene ring, a bivalent naphthalene ring, a bivalent biphenyl ring, a bivalent furan ring, a bivalent pyrrole ring, a bivalent alicyclic hydrocarbon having 5 to 8 carbon atoms and a combination thereof, in proviso that in a case where X is —CH=CH—CO—O— or —O—CO—CH=CH—, P or Q on a side to which —CH=CH— is bonded is an aromatic ring, in a case where the number of P is 2 or more, these Ps may be the same or different, and in a case where the number of Q is 2 or more, these Qs may be the same or different;

l1 represents 0 or 1;

l2 represents an integer of 0 to 2;

in a case where both l1 and l2 are 0 and T is a single bond, A also represents a single bond;

in a case where l1 is 1 and T is a single bond, B also represents a single bond; and H and I each independently represents a group selected from a bivalent benzene ring, a bivalent naphthalene ring, a bivalent biphenyl ring, a bivalent furan ring, a bivalent pyrrole ring and a combination thereof.

The photoreactive polymer may have any one photoreactive side chain selected from the group consisting of the following formulae (7) to (10):

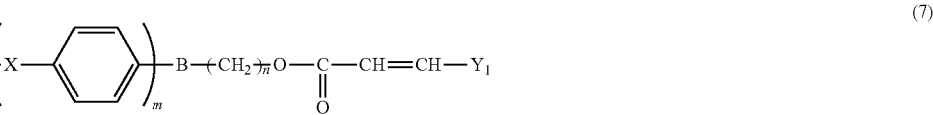
(7)

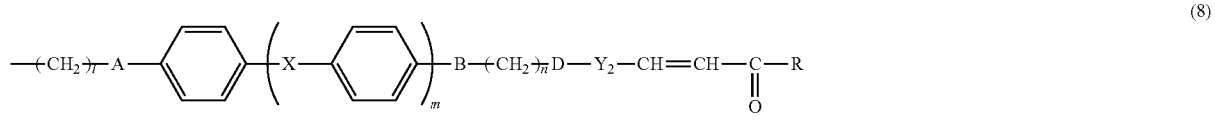
(8)

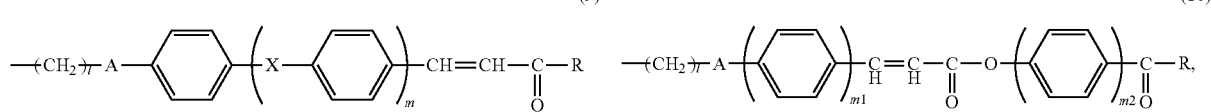
(9)

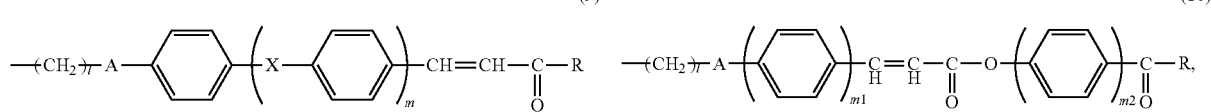
(10)

Y$_2$ represents a group selected from the group consisting of a bivalent benzene ring, a bivalent naphthalene ring, a bivalent biphenyl ring, a bivalent furan ring, a bivalent pyrrole ring, a bivalent alicyclic hydrocarbon having 5 to 8 carbon atoms and a combination thereof, wherein a hydrogen atom bonded thereto may be each independently replaced with —NO$_2$, —CN, —CH=C(CN)$_2$, —CH=CH—CN, a halogen group, an alkyl group having 1 to 5 carbon atoms, or an alkyloxy group having 1 to 5 carbon atoms;

R represents a hydroxy group, an alkoxy group having 1 to 6 carbon atoms, or has the same definition as Y$_1$;

wherein A, B, and D each independently represents a single bond, —O—, —CH$_2$—, —COO—, —OCO—, —CONH—, —NH—CO—, —CH=CH—CO—O—, or —O—CO—CH=CH—;

Y$_1$ represents a ring selected from a monovalent benzene ring, a monovalent naphthalene ring, a monovalent biphenyl ring, a monovalent furan ring, a monovalent pyrrole ring and a monovalent alicyclic hydrocarbon having 5 to 8 carbon atoms, or a group in which the same or different two to six rings selected therefrom are bonded through a bonding group B, wherein a hydrogen atom bonded thereto may be each independently replaced with —COOR$_0$ (wherein R$_0$ represents a hydrogen atom or an alkyl group having 1 to 5 carbon atoms), —NO$_2$, —CN, —CH═C(CN)$_2$, —CH═CH—CN, a halogen group, an alkyl group having 1 to 5 carbon atoms, or an alkyloxy group having 1 to 5 carbon atoms;

X represents a single bond, —COO—, —OCO—, —N═N—, —CH═CH—, —C≡C—, —CH═CH—CO—O—, or —O—CO—CH═CH—, and in a case where the number of X is 2, these Xs may be the same or different;

l represents an integer of 1 to 12;

m represents an integer of 0 to 2, and each of m1 and m2 represents an integer of 1 to 3;

n represents an integer of 0 to 12 (when n=0, B represents a single bond);

Y$_2$ represents a group selected from the group consisting of a bivalent benzene ring, a bivalent naphthalene ring, a bivalent biphenyl ring, a bivalent furan ring, a bivalent pyrrole ring, a bivalent alicyclic hydrocarbon having 5 to 8 carbon atoms and a combination thereof, wherein a hydrogen atom bonded thereto may be each independently replaced with —NO$_2$, —CN, —CH═C(CN)$_2$, —CH═CH—CN, a halogen group, an alkyl group having 1 to 5 carbon atoms, or an alkyloxy group having 1 to 5 carbon atoms; and R represents a hydroxy group, an alkoxy group having 1 to 6 carbon atoms, or has the same definition as Y$_1$.

The photoreactive polymer may have any one photoreactive side chain selected from the group consisting of the following formulae (11) to (13):

(11)

—(CH$_2$)$_l$—A—(⬡—X)$_m$—⬡⬡—C═C—C—R
                              H  H  ‖
                                    O (12)

—(CH$_2$)$_l$—A—⬡⬡—(X—⬡)$_m$—C═C—C—R
                              H  H  ‖
                                    O (13)

—(CH$_2$)$_l$—A—⬡⬡—C═C—C—O—(⬡)$_{m1}$—C—R,
              H  H  ‖              ‖
                    O              O wherein A independently represents a single bond, —O—, —CH$_2$—, —COO—, —OCO—, —CONH—, —NH—CO—, —CH═CH—CO—O—, or —O—CO—CH═CH—;

X represents a single bond, —COO—, —OCO—, —N═N—, —CH═CH—, —C≡C—, —CH═CH—CO—O—, or —O—CO—CH═CH—, and in a case where the number of X is 2, these Xs may be the same or different;

l represents an integer of 1 to 12, m represents an integer of 0 to 2, and m1 represents an integer of 1 to 3; and R represents a ring selected from a monovalent benzene ring, a monovalent naphthalene ring, a monovalent biphenyl ring, a monovalent furan ring, a monovalent pyrrole ring and a monovalent alicyclic hydrocarbon having 5 to 8 carbon atoms, or a group in which the same or different two to six rings selected therefrom are bonded through a bonding group B, wherein a hydrogen atom bonded thereto may be each independently replaced with —COOR$_0$ (wherein R$_0$ represents a hydrogen atom or an alkyl group having 1 to 5 carbon atoms), —NO$_2$, —CN, —CH═C(CN)$_2$, —CH═CH—CN, a halogen group, an alkyl group having 1 to 5 carbon atoms, or an alkyloxy group having 1 to 5 carbon atoms, a hydroxy group, or an alkoxy group having 1 to 6 carbon atoms.

The photoreactive polymer may have a photoreactive side chain represented by the following formula (14) or (15):

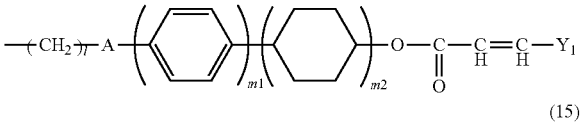

(14)

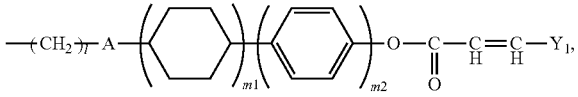

(15)

wherein A represents a single bond, —O—, —CH$_2$—, —COO—, —OCO—, —CONH—, —NH—CO—, —CH═CH—CO—O—, or —O—CO—CH═CH—;

Y$_1$ represents a ring selected from a monovalent benzene ring, a monovalent naphthalene ring, a monovalent biphenyl ring, a monovalent furan ring, a monovalent pyrrole ring and a monovalent alicyclic hydrocarbon having 5 to 8 carbon atoms, or a group in which the same or different two to six rings selected therefrom are bonded through a bonding group B, wherein a hydrogen atom bonded thereto may be each independently replaced with —COOR$_0$ (wherein R$_0$ represents a hydrogen atom or an alkyl group having 1 to 5 carbon atoms), —NO$_2$, —CN, —CH═C(CN)$_2$, —CH═CH—CN, a halogen group, an alkyl group having 1 to 5 carbon atoms, or an alkyloxy group having 1 to 5 carbon atoms;

l represents an integer of 1 to 12, and each of m1 and m2 represents an integer of 1 to 3.

The photoreactive polymer may have a photoreactive side chain represented by the following formula (16) or (17):

(16)

—(CH$_2$)$_l$—A—(⬡—X)$_m$—[coumarin]

(17)

—(CH$_2$)$_l$—A—(⬡—X)$_m$—[coumarin], wherein A represents a single bond, —O—, —CH$_2$—, —COO—, —OCO—, —CONH—, —NH—CO—, —CH═CH—CO—O—, or —O—CO—CH═CH—;

X represents a single bond, —COO—, —OCO—, —N═N—, —CH═CH—, —C≡C—, —CH═CH—CO—O—, or —O—CO—CH═CH—, and in a case where the number of X is 2, these Xs may be the same or different; and l represents an integer of 1 to 12, and m represents an integer of 0 to 2.

The photoreactive polymer may have a photoreactive side chain may represented by the following formula (18) or (19):

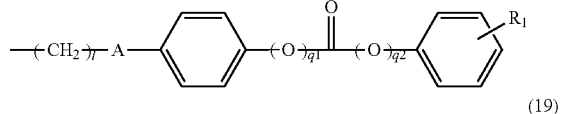

(18)

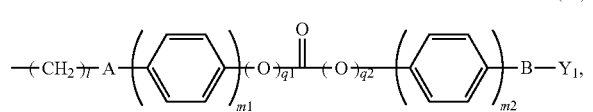

(19)

wherein A and B each independently represents a single bond, —O—, —CH$_2$—, —COO—, —OCO—, —CONH—, —NH—CO—, —CH=CH—CO—O—, or —O—CO—CH=CH—;

Y$_1$ represents a ring selected from a monovalent benzene ring, a monovalent naphthalene ring, a monovalent biphenyl ring, a monovalent furan ring, a monovalent pyrrole ring and a monovalent alicyclic hydrocarbon having 5 to 8 carbon atoms, or a group in which the same or different two to six rings selected therefrom are bonded through a bonding group B, wherein a hydrogen atom bonded thereto may be each independently replaced with —COOR$_0$ (wherein R$_0$ represents a hydrogen atom or an alkyl group having 1 to 5 carbon atoms), —NO$_2$, —CN, —CH=C(CN)$_2$, —CH=CH—CN, a halogen group, an alkyl group having 1 to 5 carbon atoms, or an alkyloxy group having 1 to 5 carbon atoms;

one of q1 and q2 is 1, and another is 0;

l represents an integer of 1 to 12, and each of m1 and m2 represents an integer of 1 to 3;

R$_1$ represents a hydrogen atom, —NO$_2$, —CN, —CH=C(CN)$_2$, CH=CH—CN, a halogen group, an alkyl group having 1 to 5 carbon atoms, or an alkyloxy group having 1 to 5 carbon atoms.

The photoreactive polymer may have a photoreactive side chain represented by the following formula (20):

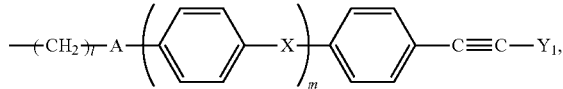

(20)

wherein A represents a single bond, —O—, —CH$_2$—, —COO—, —OCO—, —CONH—, —NH—CO—, —CH=CH—CO—O—, or —O—CO—CH=CH—;

Y$_1$ represents a ring selected from a monovalent benzene ring, a monovalent naphthalene ring, a monovalent biphenyl ring, a monovalent furan ring, a monovalent pyrrole ring and a monovalent alicyclic hydrocarbon having 5 to 8 carbon atoms, or a group in which the same or different two to six rings selected therefrom are bonded through a bonding group B, wherein a hydrogen atom bonded thereto may be each independently replaced with —COOR$_0$ (wherein R$_0$ represents a hydrogen atom or an alkyl group having 1 to 5 carbon atoms), —NO$_2$, —CN, —CH=C(CN)$_2$, —CH=CH—CN, a halogen group, an alkyl group having 1 to 5 carbon atoms, or an alkyloxy group having 1 to 5 carbon atoms;

X represents a single bond, —COO—, —OCO—, —N=N—, —CH=CH—, —C≡C—, —CH=CH—CO—O—, or —O—CO—CH=CH—, and in a case where the number of X is 2, these Xs may be the same or different; and l represents an integer of 1 to 12, and m represents an integer of 0 to 2.

Further, as the components for forming a photoreactive polymer film, the film may comprise a polymer having any one liquid crystalline side chain selected from the group consisting of the following formulae (21) to (31). For example, in a case where a photoreactive side chain in the photoreactive polymer does not have liquid crystalline property, or in a case where a main chain in the photoreactive polymer does not have liquid crystalline property, the photoreactive polymer may comprise any one liquid crystalline side chain selected from the group consisting of the following formulae (21) to (31):

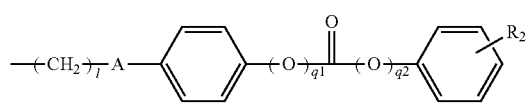

(21)

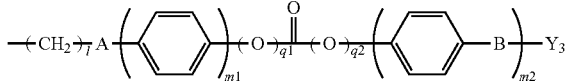

(22)

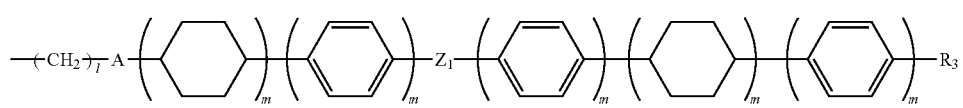

(23)

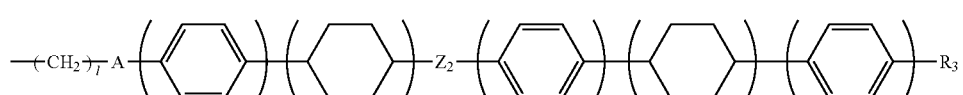

(24)

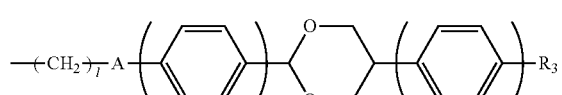

(25)

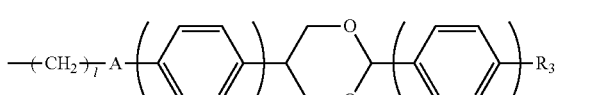

(26)

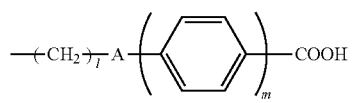
(27)

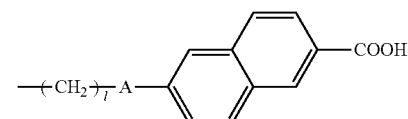
(28)

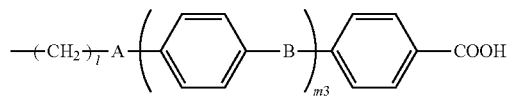
(29)

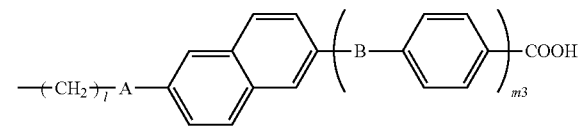
(30)

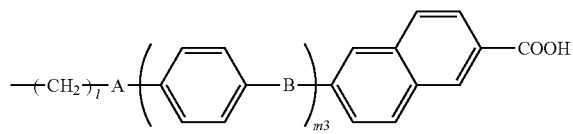
(31)

wherein A, B, q1 and q2 each has the same definition as mentioned above;

$Y_3$ represents a group selected from a monovalent benzene ring, a monovalent naphthalene ring, a monovalent biphenyl ring, a monovalent furan ring, a monovalent nitrogen-containing heterocyclic ring, and a monovalent alicyclic hydrocarbon having 5 to 8 carbon atoms, and a combination thereof, wherein a hydrogen atom bonded thereto may be each independently replaced with —$NO_2$, —CN, a halogen group, an alkyl group having 1 to 5 carbon atoms, or an alkyloxy group having 1 to 5 carbon atoms;

$R_3$ represents a hydrogen atom, —$NO_2$—CN, —CH=C(CN)$_2$, —CH=CH—CN, a halogen group, a monovalent benzene ring, a monovalent naphthalene ring, a monovalent biphenyl ring, a monovalent furan ring, a monovalent nitrogen-containing heterocyclic ring, a monovalent alicyclic hydrocarbon having 5 to 8 carbon atoms, an alkyl group having 1 to 12 carbon atoms, or an alkoxy group having 1 to 12 carbon atoms;

l represents an integer of 1 to 12; m represents an integer of 0 to 2, in proviso that all sum of m is 2 or more in the formula (23) or (24), that all sum of m is 1 or more in the formula (25) or (26);

m1, m2 and m3 independently represents an integer of 1 to 3;

$R_2$ represents a hydrogen atom, —$NO_2$, —CN, a halogen group, a monovalent benzene ring, a monovalent naphthalene ring, a monovalent biphenyl ring, a monovalent furan ring, a monovalent nitrogen-containing heterocyclic ring, a monovalent alicyclic hydrocarbon having 5 to 8 carbon atoms, an alkyl group, or an alkyloxy group;

$Z_1$ and $Z_2$ independently represents a single bond, —CO—, —$CH_2$O—, —CH=N—, or —$CF_2$—.

<<Method for Producing Photoreactive Polymer Film>>

The photoreactive polymer film can be obtained by polymerizing a photoreactive side chain monomer having the photoreactive side chain, and in some cases, by copolymerizing the photoreactive side chain monomer and a monomer having the liquid crystalline side chain. For example, the photoreactive polymer film can be obtained by referring to [0062] to [0090] of WO 2017/061536 A (the entire contents thereof are incorporated herein by reference).

<<(C) Liquid Crystal>>

The terahertz wave control element according to the present invention comprise a (C) liquid crystal.

The liquid crystal (C) is located in a space formed by locating the first flat plate and the second flat plate to be parallel to each other with a predetermined distance therebetween so that the first and second liquid crystal alignment films are opposite to each other.

The (C) liquid crystal is not particularly limited as long as it is a liquid crystal aligned by the first and second liquid crystal alignment films. Furthermore, it is more preferable as a difference $\Delta n = n_e - n_o$ between the abnormal light refractive index $n_e$ and the normal light refractive index $n_o$ of the liquid crystal is larger.

The (C) liquid crystal may use a nematic liquid crystal, a ferroelectric liquid crystal or the like as it is, which have been conventionally used for a liquid crystal display element or the like.

Specific examples of the (C) liquid crystal may include, but are not limited to, cyanobiphenyls such as 4-cyano-4'-n-pentyl biphenyl, 4-cyano-4'-n-heptyloxy biphenyl or the like; cholesteryl esters such as cholesteryl acetate, cholesteryl benzoate or the like; carbonate esters such as 4-carboxyphenyl ethyl carbonate, 4-carboxyphenyl-n-butyl carbonate or the like; phenyl esters such as phenyl benzoate, biphenyl phthalate or the like; Schiff's bases such as benzylidene-2-naphthylamine, 4'-n-butoxybenzylidene-4-acetyl aniline or the like; benzidines such as N,N'-bisbenzylidene benzidine, p-dianisalbenzidine or the like; azoxybenzenes such as 4,4'-azoxydianisole, 4,4'-di-n-butoxy azoxybenzene or the like; liquid crystals such as phenylcyclohexyls, terphenyls, phenyl bicyclohexyls or the like, specifically indicated below.

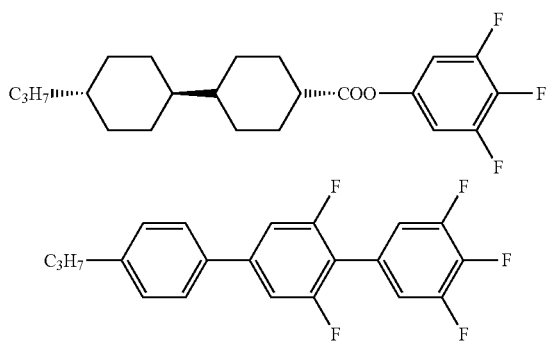

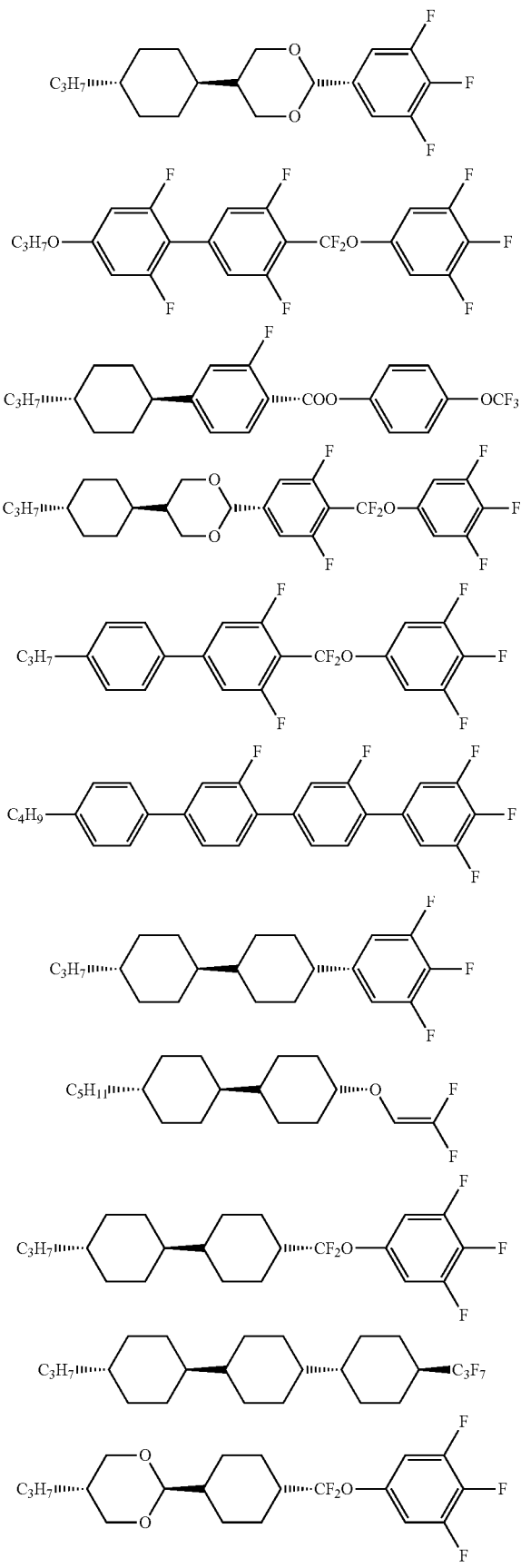
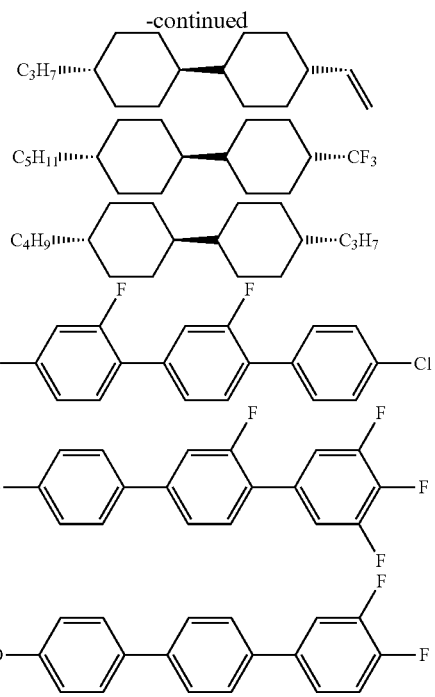

The (C) liquid crystal in the terahertz wave control element of the present invention having the above-described configuration, has the following alignment state:

(D1) When no voltage is applied, the terahertz wave control element has a first portion in which the liquid crystal is aligned in a first direction parallel to the (A) first flat plate and the (B) second flat plate, and a second portion in which the liquid crystal is aligned in a second direction orthogonal to the first direction and parallel to the (A) first flat plate and the (B) second flat plate.

(D2) The first portion has a first width, the second portion has a second width, and the first and second portions are disposed adjacent to each other and alternately disposed in a predetermined cycle.

(D3) When a voltage is applied, the liquid crystal in each of the first portion and the second portion is aligned in a direction orthogonal to the (A) first flat plate and the (B) second flat plate.

The first direction may be a direction parallel to a width direction of the above-described first width. Further, a ratio of the first width w1 to a predetermined cycle Λ, w1/Λ, may be 0.45 to 0.55, preferably 0.49 to 0.53, more preferably 0.51 to 0.53, and most preferably 0.523 to 0.524.

FIG. 1 is a schematic view illustrating a terahertz wave control element of the present invention. In FIG. 1, (a) illustrates the above-described (D1), i.e., an alignment direction of the liquid crystal when no voltage is applied, and (b) illustrates the above-described (D3), i.e., the alignment of the liquid crystal when a voltage is applied. In (a) and (b), the liquid crystal is located in a space in which the first flat plate comprising quartz glass as the first substrate, a NiCr layer as the first electrode, and the first liquid crystal alignment film, and the second flat plate comprising quartz glass as the second substrate, a NiCr layer as the second electrode, and the second liquid crystal alignment film are located in parallel to each other with a distance therebetween so that the first and second liquid crystal alignment films are opposite to each other.

In (a) and (b) of FIG. 1, the terahertz wave control element has a 1st portion in which the liquid crystal alignment film is aligned in a 1st direction parallel to the first flat plate and the second flat plate (in FIG. 1, the direction represented by the arrow pointing to the right →) and a second portion in which the liquid crystal alignment film is aligned in a 2nd direction orthogonal to the 1'st direction and parallel to the first flat plate and the second flat plate (in FIG. 1, the direction represented by the direction (⊙) that is orthogonal to the paper surface and moves away from the paper surface).

In (a) of FIG. 1, (D1) when no voltage is applied, the terahertz wave control element has a first portion in which the liquid crystal is aligned in a 1st direction parallel to the first flat plate and the second flat plate (in FIG. 1, the portion represented by the arrow pointing to the right →) and a second portion in which the liquid crystal is aligned in a 2nd direction orthogonal to the 1st direction and parallel to the first flat plate and the second flat plate (in FIG. 1, the portion represented in the direction orthogonal to the paper surface).

Further, in (b) of FIG. 1, (D3) when a voltage is applied, the liquid crystal in each of the first and second portions is aligned in a direction orthogonal to the first flat plate and the second flat plate.

A terahertz wave transmitted through the terahertz wave control element of the present invention configured as described above can results in (E) a phase change independent on a state of polarization.

A mechanism in which the terahertz wave control element of the present invention causes a phase change in which a terahertz wave transmitted through the element is independent of a state of polarization will be described hereinafter.

Figure 2:
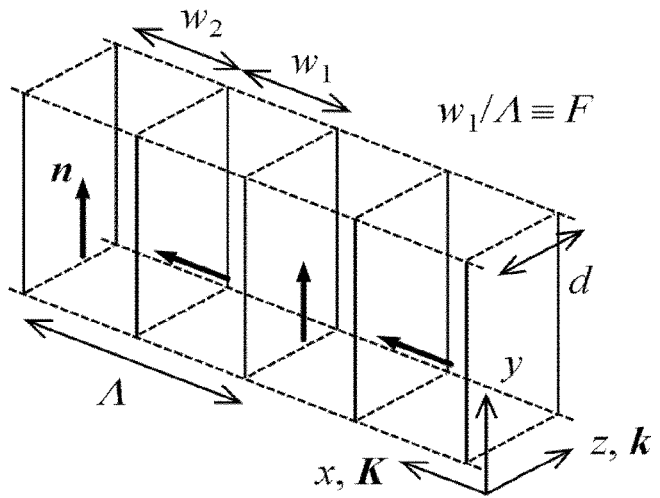
FIG. 2 is a schematic view illustrating a one-dimensional lattice structure by a uniaxially anisotropic liquid crystal having configurations (D1) to (D3) of the present invention.

FIG. 2 illustrates a one-dimensional lattice structure by a uniaxially anisotropic liquid crystal having configurations, specifically, the configurations (D1) to (D3) of the present invention. In FIG. 2, it is assumed that a liquid crystal layer is parallel to the xy plane and a propagation direction of an incident wave (wave number vector k of the incident wave) is parallel to the z-axis, considering an orthogonal coordinate system of xyz. When the lattice vector K is taken in the x-axis direction, and the angle formed by the x-axis and the director n (the same as the alignment direction of the liquid crystal) is θ (x), the lattice vector K is represented by the following Equation (1):

$$\theta(x) = \begin{cases} 0 & \text{for } m\Lambda \leq x < (m+F)\Lambda, \\ \pi/2 & \text{for } (m+F)\Lambda \leq x < (m+1)\Lambda, \end{cases} \quad (1)$$

In the Equation (1), Λ represents a lattice cycle, represents an integer, and F represents a filling rate (a duty ratio of the lattice) in a region where θ=0. Furthermore, when 0≤F≤1 is satisfied and a width of the region where θ=0 is w, F=w/Λ. When the lattice cycle Λ is sufficiently smaller than the wavelength of the incident wave, a specific dielectric constant tensor ε of the lattice structure can be represented by Equation (2) based on the effective medium theory. Furthermore, $n_{para}$ and $n_{perp}$ are represented by the following Equations (3) and (4), respectively, and $n_o$ and $n_o$ are the normal light refractive index $n_e$ and the abnormal light refractive index $n_o$ of the liquid crystal, respectively, as described above.

$$\varepsilon = \begin{bmatrix} n_{para}^2 & 0 & 0 \\ 0 & n_{perp}^2 & 0 \\ 0 & 0 & n_{perp}^2 \end{bmatrix} \quad (2)$$

-continued $$n_{para} = \left[\frac{F}{n_e^2} + \frac{1-F}{n_o^2}\right]^{-1/2} \quad (3)$$

$$n_{perp} = \left[Fn_o^2 + (1-F)n_e^2\right]^{1/2} \quad (4)$$

Figure 3:
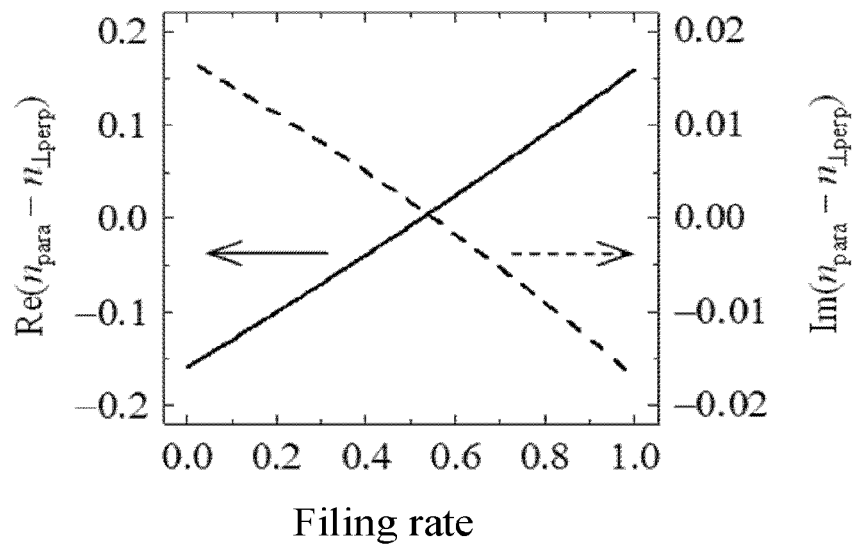
FIG. 3 is a view illustrating anisotropy $n_{para}-n_{perp}$ of an effective refractive index in a case where a nematic liquid crystal 5CB is used as a liquid crystal, and a normal light refractive index $n_o$ and an abnormal light refractive index $n_e$ in a terahertz band of the 5CB are set to $n_o=1.58+i0.031$ and $n_e=1.74+i0.014$, respectively.

For example, when the nematic liquid crystal 5CB is used as a liquid crystal, a refractive index in a terahertz band of the nematic liquid crystal 5CB is set to $n_o$=1.58+i0.031 and $n_e$=1.74+i0.014 with reference to the literature, and anisotropy $n_{para}-n_{perp}$ of an effective refractive index is illustrated in FIG. 3.

From the results of FIG. 3, it can be seen that an effective birefringence Re ($n_{para}-n_{perp}$) can be set to 0 by appropriately selecting the filling rate F. For example, as for the data illustrated in FIG. 3, the effective birefringence Re ($n_{para}-n_{perp}$)=0.00 is realized in 0.51≤F≤0.53. On the other hand, in a case where the liquid crystal layer has a homogeneous homeotropic alignment (in a case where n and z are parallel to each other), the refractive index for normal incidence is $n_o$ regardless of polarization. Therefore, the alignment state shifts from the structure of FIG. 2 to the homeotropic alignment is performed, such that a phase shift of 2πf [$n_{real}$-Re($n_o$)]d/c is obtained regardless of the polarization. Here, f is a frequency of the incident wave, d is a thickness of the liquid crystal layer, c is a speed of light in vacuum, and $n_{real}$ is a real part of the effective refractive index of the lattice when Re ($n_{para}-n_{perp}$)=0.

The terahertz wave control element of the present invention can be used for an intensity modulator for wireless information communication, a non-destructive tomographic measuring system of a structure, an interference microscope applicable to living body observation, and the like.

[C]
<Method for Producing Terahertz Wave Control Element>

The terahertz wave control element of the present invention can be produced by the method comprising the steps of:

(I) preparing a first substrate capable of transmitting a terahertz wave, the first substrate having one surface provided with a first electrode capable of transmitting a terahertz wave;

(II) preparing a first liquid crystal aligning agent comprising a photoreactive polymer having a photoreactive side chain that causes at least one reaction selected from the group consisting of (A-1) photocrosslinking and (A-2) photoisomerization;

(III) applying the first liquid crystal aligning agent on the first electrode of the first substrate, to form a first liquid crystal alignment film;

(IV) (i) a 1st light irradiation step: irradiating the first liquid crystal alignment film with a first polarized light through a photomask having a 1st region with a first width that transmits the first polarized light and a second region with a second width that does not transmit the first polarized light alternately in a predetermined cycle, to cause a reaction in the photoreactive polymer in a first portion corresponding to the first region of the first liquid crystal alignment film; and (ii) a 2nd light irradiation step: disposing the photomask so that a second portion different from the first portion in the 1st light irradiation step is formed as a region capable of transmitting a second polarized light orthogonal to the first polarized light, and irradiating the first liquid crystal alignment film with the second polarized light through the photomask to cause a reaction in the photoreactive polymer in the second portion of the first liquid crystal alignment film;

(V) performing heat treatment on the substrate obtained after the 1st and 2nd light irradiation steps, to obtain a first flat plate;

(I') preparing a second substrate capable of transmitting a terahertz wave, the second substrate having one surface provided with a second electrode capable of transmitting a terahertz wave;

(II') preparing a second liquid crystal aligning agent comprising a photoreactive polymer having a photoreactive side chain that causes at least one reaction selected from the group consisting of (A-1) photocrosslinking and (A-2) photoisomerization;

(III') applying the second liquid crystal aligning agent on the second electrode of the second substrate, to form a second liquid crystal alignment film;

(IV') (i') a 1'st light irradiation step: irradiating the second liquid crystal alignment film with a first polarized light through the photomask, to cause the reaction in the photoreactive polymer in a 1'st portion corresponding to the first region of the second liquid crystal alignment film; and (ii) a 2'nd light irradiation step: disposing the photomask so that a 2'nd portion different from the 1'st portion in the 1'st light irradiation step is formed as a region capable of transmitting a second polarized light orthogonal to the first polarized light, and irradiating the second liquid crystal alignment film with the second polarized light through the photomask to cause the reaction in the photoreactive polymer in the 2'nd portion of the second liquid crystal alignment film;

(V') performing heat treatment on the substrate obtained after the 1'st and 2'nd light irradiation steps, to obtain a second flat plate;

(VI) locating the first flat plate and the second flat plate in parallel with a predetermined distance therebetween so that the first and second liquid crystal alignment films are opposite to each other, the 1st portion of the first liquid crystal alignment film and the 1'st portion of the second liquid crystal alignment film are opposite to each other, and the 2nd portion of the first liquid crystal alignment film and the 2'nd portion of the second liquid crystal alignment film are opposite to each other, to provide a space between the first flat plate and the second flat plate; and (VII) filling the space with a liquid crystal; Thereby to obtain the terahertz wave control element.

Here, the steps (I) to (V) are steps for obtaining the first flat plate, and the steps (I') to (V') are steps for obtaining the second flat plate.

As described above, the first flat plate and the second flat plate may be the same as or different from each other, and may be preferably the same as each other. Although the first or second substrate, the first or second electrode, and the first or second liquid crystal alignment film are different from each other between the first flat plate and the second flat plate, the same method is used for the method to be used, and thus, the steps (I) to (V) will be described in detail below, and description of the steps (I') to (V') will be omitted.

The step (I) is a step of preparing a first substrate capable of transmitting a terahertz wave, the first substrate having one surface provided with a first electrode capable of transmitting a terahertz wave.

The first electrode and the first substrate are as described above.

A method for providing the first electrode on one surface of the first substrate depends on the first substrate to be used and the first electrode to be used. For example, NiCr can be obtained by vacuum vapor deposition, and PEDOT/PSS can be obtained by spin coating of an aqueous solution.

The step (II) is a step of preparing a first liquid crystal aligning agent comprising a photoreactive polymer having a photoreactive side chain that causes at least one reaction selected from the group consisting of (A-1) photocrosslinking and (A-2) photoisomerization.

The photoreactive side chain and the photoreactive polymer are as described above.

The first liquid crystal aligning agent is comprised of the photoreactive polymer and a solvent, which dissolves the photoreactive polymer. Furthermore, the first liquid crystal aligning agent may comprise an optional component other than the photoreactive polymer and the solvent.

Examples of the optional component may include, but are not limited to, components described in WO 2014/185410 A, such as "other monomers" (paragraphs[0099] to[0103] of WO 2014/185410 A), "polymerization initiator" (paragraphs[0105] to[0108] of the same publication), "solvent" (paragraphs[0109] to[0111] of the same publication), "other polymers" (paragraph[0117] of the same publication), and "crosslinkable compound" (paragraphs[0118] to[0137] and the like of the same publication) described in WO 2014/185410 A.

The step (III) is a step of applying the first liquid crystal aligning agent on the first electrode of the first substrate, to form a first liquid crystal alignment film.

For the application method, a conventionally-known method, for example, spin coating, can be used, depending on the first liquid crystal aligning agent to be used.

Furthermore, a step of heating at a predetermined temperature may be provided after the application. The predetermined temperature depends on the photoreactive polymer to be used, the first liquid crystal aligning agent to be used, the first substrate to be used, the first electrode to be used, and the like. The temperature may be, but is not limited to, the temperature described in the paragraph[0151] of WO 2014/185410 A.

The step (IV) comprises a (i) 1st light irradiation step and a (ii) 2nd light irradiation step.

The (i) 1st light irradiation step is a step of irradiating the first liquid crystal alignment film with a first polarized light through a photomask having a 1st region with a first width that transmits the first polarized light and a second region with a second width that does not transmit the first polarized light alternately in a predetermined cycle, to cause a reaction, i.e., at least one reaction selected from the group consisting of (A-1) photocrosslinking and (A-2) photoisomerization, in the photoreactive polymer in a first portion corresponding to the first region of the first liquid crystal alignment film.

In addition, the (ii) 2nd light irradiation step is a step of disposing the photomask so that a second portion different from the first portion in the 1st light irradiation step is formed as a region capable of transmitting a second polarized light orthogonal to the first polarized light, and irradiating the first liquid crystal alignment film with the second polarized light through the photomask to cause a reaction, i.e., at least one reaction selected from the group consisting of (A-1) photocrosslinking and (A-2) photoisomerization, in the photoreactive polymer in the second portion of the first liquid crystal alignment film.

After the (i) first and (ii) second light irradiation steps in the step (IV) are completed, and after the step (VII) of filling the space with a liquid crystal, the liquid crystal is aligned so that in the configuration (D1), that is, (D1) when no voltage is applied, the terahertz wave control element has a first portion in which the liquid crystal is aligned in a first direction parallel to the first flat plate (A) and the second flat plate (B), and a second portion in which the liquid crystal is aligned in a second direction orthogonal to the first direction and parallel to the first flat plate (A) and the second flat plate (B).

The step (V) is a step of performing heat treatment on the substrate obtained after the 1st and 2nd light irradiation steps, to obtain a first flat plate. The heat treatment may include, but is not limited to, the heat treatment performed at a temperature described in the paragraphs [0154] and [0155] of WO 2014/185410 A, depending on the first substrate to be used, the first electrode to be used, the first liquid crystal aligning agent to be used, and the like.

Furthermore, as described above, the steps (I') to (V') are steps of preparing the second flat plate. In the steps (I') to (VI'), the first flat plate is only replaced with the second flat plate, and the steps themselves are the same, and thus, a description thereof will be omitted.

The step (VI) is a step of locating the first flat plate and the second flat plate in parallel with a predetermined distance therebetween so that the first and second liquid crystal alignment films are opposite to each other, the 1st portion of the first liquid crystal alignment film and the 1'st portion of the second liquid crystal alignment film are opposite to each other, and the 2nd portion of the first liquid crystal alignment film and the 2'nd portion of the second liquid crystal alignment film are opposite to each other, to provide a space between the first flat plate and the second flat plate.

In order to dispose the first portions of the first and second liquid crystal alignment films and the second portions of the first and second liquid crystal alignment films so as to be opposite to each other, for example, as described in examples to be described below, the alignment may be performed so that lattice vector directions of the both alignment films are parallel to each other and a spatial phase difference of the lattices is 0 under observation with a polarization microscope.

The step (VII) is a step of filling the space obtained by the step (VI) with a liquid crystal. Furthermore, the liquid crystal is as described in the (C) liquid crystal described above.

A terahertz wave control element can be produced by the steps (I) to (VII). Furthermore, the terahertz wave control element obtained as described above can exhibit operations of the configurations (D1) to (D3) and (E) described above:

(D1) When no voltage is applied, the terahertz wave control element has a first portion in which the liquid crystal is aligned in a first direction parallel to the (A) first flat plate and the (B) second flat plate, and a second portion in which the liquid crystal is aligned in a second direction orthogonal to the first direction and parallel to the (A) first flat plate and the (B) second flat plate, (D2) the first portion has a first width, the second portion has a second width, and the first and second portions are disposed adjacent to each other and alternately disposed in a predetermined cycle, (D3) when a voltage is applied, the liquid crystal in each of the first portion and the second portion is aligned in a direction orthogonal to the first flat plate and the (B) second plate, and (E) a terahertz wave transmitted through the terahertz wave control element can result in a phase change independent on a state of polarization.

Hereinafter, the present invention will be described in more detail by using, but not limited to, following examples.

EXAMPLES

Two sheets of quartz glass (thickness: 0.96 mm) having a relatively high transmittance in the terahertz band were prepared, and a NiCr thin film (thickness: 0.01 μm) was vapor-deposited as a transparent electrode in the terahertz band on each surface.

For each of the two substrates, a photo-aligning agent (manufactured by Nissan Chemical Corporation) was applied to the surface provided with the NiCr thin film, and a photo-alignment film (thickness: about 0.1 μm) was formed by a spin coating method. Furthermore, a photoreactive polymer derived from monomers represented by the following Formulas MA1 and MA2 are contained in the photo-aligning agent (manufactured by Nissan Chemical Corporation). The photoreactive polymer is irradiated with linearly polarized ultraviolet light and heat-treated to induce an alignment regulating force, and an easy-to-align axis is orthogonal to alignment of the linearly polarized light.

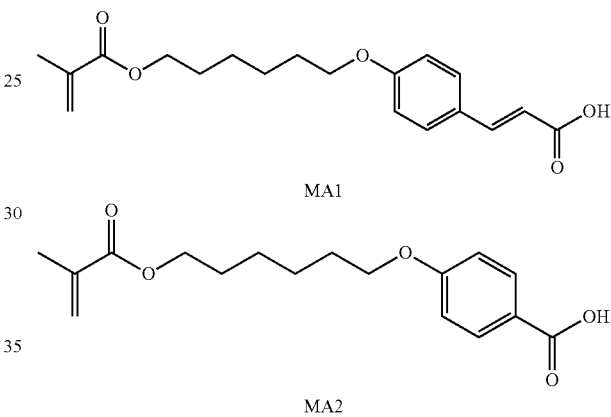

MA1

MA2

Figure 4:
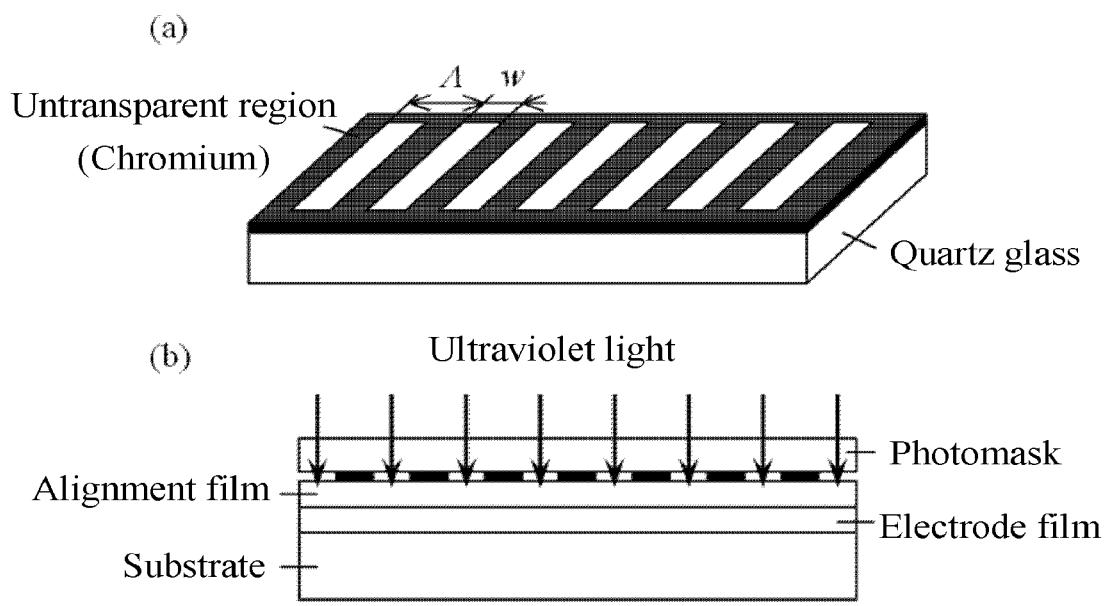
FIG. 4 is a schematic view illustrating a photomask 1 used in Examples.

In a substrate comprising the obtained photo-alignment film, the photo-alignment film was exposed to light with an ultraviolet exposure device (KIN-ITSU-KUN 50, Yamashita Denso) through a bandpass filter having a central wavelength of 313 nm, a polarizer, and a photomask (CA25E20LPMM, Edmund Optics). FIG. 4 schematically illustrates a photomask to be used and an exposure method using the photomask. As schematically illustrated in FIG. 4(a), a one-dimensional amplitude type binary lattice (Ronchi Ruling) photomask having a lattice cycle Λ of 50 μm and a line width w of 25 μm was used. As illustrated in FIGS. 4(a) and 4(b), the photomask does not transmit the ultraviolet light in the blackened opaque region, but transmits the ultraviolet light in the opening at the line width w. The photomask was disposed on the obtained substrate, specifically, on the photo-alignment film so as to be in contact with the photo-alignment film.

The exposure was performed twice on the photo-alignment film of each substrate as described below.

In the first time, the exposure was performed so that the orientation of the ultraviolet linearly polarized light was parallel to the lattice vector direction of the photomask by the polarizer. In the second time, the substrate was moved by 25 μm in the lattice vector direction by a microstage, and the exposure was performed so that the orientation of ultraviolet linearly polarized light was orthogonal to the lattice vector direction by the polarizer. In any exposure, the ultraviolet light intensity was 6.3 mW/cm$^2$, and the exposure time was 2.4 seconds. After the exposure, heat treatment was performed on the substrate on a hot plate at 140° C. for 10 minutes.

The two substrates obtained as described above were superposed with a zirconia ball spacer having a diameter of about 0.3 mm so that the photo-alignment films of the respective substrates were located to be opposite to each other, and were aligned so that the lattice vector directions of the both alignment films were parallel to each other and the spatial phase difference of the lattices was 0 (for example, so as to be disposed as illustrated in FIG. 1) under observation with a polarization microscope, and thus, the substrates were bonded to each other with an adhesive.

After an interval between pores was measured by an optical microgauge (C11011, Hamamatsu Photonics K.K.) (interval: 0.34 mm), a nematic liquid crystal 5CB (Tokyo Chemical Industry Co., Ltd.) was injected to obtain a liquid crystal cell, that is, a terahertz wave control element.

A transmission spectrum in a terahertz band of the obtained liquid crystal cell, that is, the terahertz wave control element was measured by a terahertz time domain spectroscopic system (TAS7500, Advantest Corporation). Linear polarization was used for incidence and detection, and an electric field thereof and a lattice vector of the liquid crystal cell were parallel or orthogonal to each other. The terahertz wave was irradiated perpendicularly to the cell. The measurement environment was set to room temperature.

As a result of observing the produced liquid crystal cell, that is, the terahertz wave control element with the polarization microscope, although not illustrated, it was considered that the obtained liquid crystal cell, that is, the terahertz wave control element, had an alignment distribution as illustrated in FIG. 1.

Figure 5:
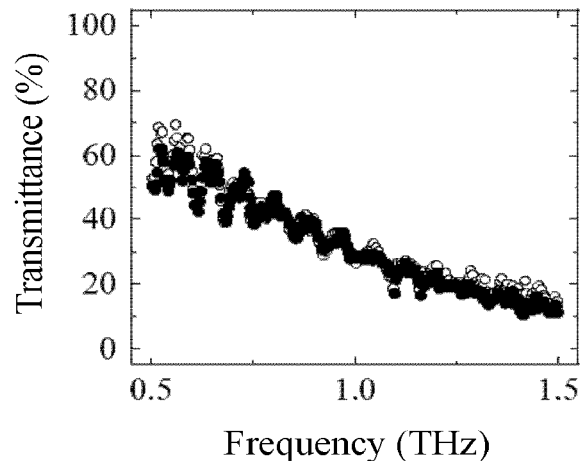
FIG. 5 is a view illustrating a measurement result (a) and a calculation result (b) of a transmittance in a terahertz band of a terahertz wave control element obtained by Examples.
Figure 5:
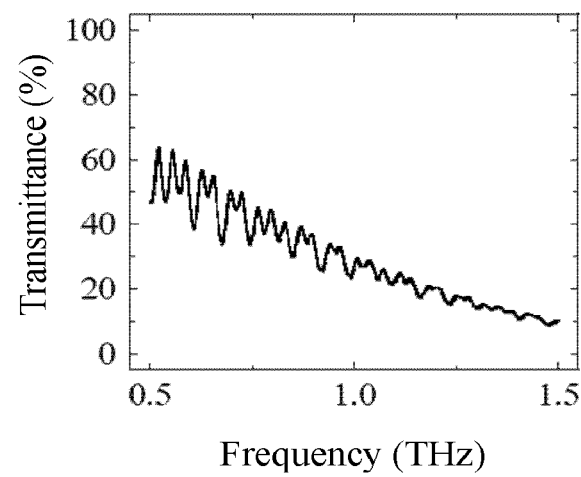

The measurement results of the transmittance in the terahertz band are illustrated in FIG. 5(a). Furthermore, in FIG. 5(a), the black circle plots are the measurement results of the transmittance in the case where the electric field vector E and the lattice vector K are parallel to each other, and the white circle plots are the measurement results of the transmittance in the case where the electric field vector E and the lattice vector K are parallel to each other.

It is shown from FIG. 5(a) that the transmittance was almost the same between the case where the electric field vector E and the lattice vector K were parallel to each other and the case where the electric field vector E and the lattice vector K were perpendicular to each other, and that the polarization dependence was sufficiently small.

FIG. 5(b) illustrates a theoretical transmittance calculated by Fresnel's equation. The solid line indicates calculation results for the case where the electric field vector E and the lattice vector K are parallel to each other, and the broken line indicates calculation results for the case where the electric field vector E and the lattice vector K are perpendicular to each other. In this calculation, the liquid crystal cell was modeled into a three-layer structure of a quartz glass substrate, a liquid crystal layer, and a quartz glass substrate. Since the alignment film was a dielectric and was sufficiently thinner than the wavelength of the terahertz wave, it was not considered in the calculation. It was assumed that the refractive index of the external space was 1, the thickness of the quartz glass substrate was $d_{glass}$ of 0.96 mm, the refractive index of the quartz glass substrate was $n_{glass}$ of 1.96+i0.9×10−14f, the thickness of the liquid crystal layer d was 0.34 mm, the refractive index of the liquid crystal layer in a case where the electric field vector E and the lattice vector K were parallel to each other was $n_{para}$ of 1.65+i0.024, and the refractive index of the liquid crystal layer in a case where the electric field vector E and the lattice vector K were perpendicular to each other was $n_{perp}$ of 1.66+i0.022. Here, $d_{glass}$ and $n_{glass}$ are determined from the result of the terahertz time domain spectroscopic measurement of the used quartz glass substrate alone, and d is the measurement result of the distance of the empty cell. In addition, $n_{para}$ and $n_{perp}$ were calculated from Equations (3) and (4) assuming that the refractive indexes $n_o$: 1.58+i0.031 and $n_e$: 1.74+i0.014 of the nematic liquid crystal 5CB were set as described above, and it was set to F=0.50 from the duty ratio of the used photomask. In the calculation results, almost the same transmittance was obtained in the case where the electric field vector E and the lattice vector K were parallel to each other and in the case where the electric field vector E and the lattice vector K were perpendicular to each other. In addition, the measurement results were also consistent with each other relatively well. It is presumed from the results that the refractive index of the liquid crystal cell, i.e., the terahertz wave control element produced in the Example can be well explained by the above-described effective medium theory, and that the loss due to scattering is also negligibly small.

Figure 6:
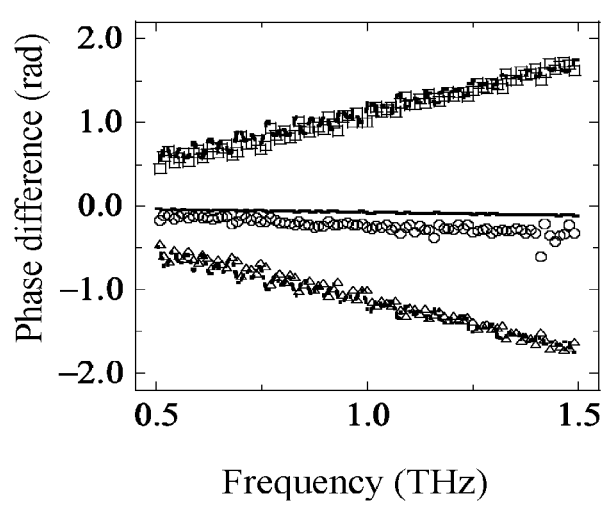
FIG. 6 is a view illustrating a phase difference of transmitted waves between the case where an electric field vector E and a lattice vector K of the terahertz wave control element obtained by Examples are parallel to each other and the case where the electric field vector E and the lattice vector K are perpendicular to each other.

FIG. 6 illustrates the phase difference of transmitted waves in the case where the electric field vector E and the lattice vector K are parallel to each other and in the case where the electric field vector E and the lattice vector K are perpendicular to each other. In FIG. 6, the white circle plots indicate results of the terahertz wave control element (F=0.5) obtained by this example, and the solid line indicates calculation results in the case where F=0.5.

Further, for comparison, FIG. 6 also illustrates the measurement results and the calculation results for the liquid crystal cell (when the filling rate is formally used, F=1 or F=0) with a homogeneous parallel alignment (homogeneous alignment) produced without using a photomask (the square plot and the broken line indicate the actual measurement results and the calculation results in the case where F=1, respectively, and the triangular plots and the alternate long and short dash line indicate the actual measurement results and the calculation results in the case where F=0, respectively). Also in the homogeneous alignment cell, the thickness d of the liquid crystal layer was set to 0.34 mm, and the nematic liquid crystal 5CB was used for the liquid crystal.

The measurement results and the calculation results of the phase difference of the homogeneous alignment cell were consistent with each other relatively well, suggesting that the refractive indexes $n_o$ and $n_e$ of the nematic liquid crystal 5CB used for the calculation are reasonable values.

On the other hand, significant differences between the measurement results and the calculation results of the liquid crystal cell having a sub-wavelength lattice structure were observed. When converted to the effective birefringence Re ($n_{para}-n_{perp}$), the value was −0.01 in the theoretical model, but that of the measurement results was −0.03. The birefringence observed in the measurements is consistent with the theoretical birefringence when F=0.43±0.1 (that is, w1=21 μm). According to the polarization microscope image of the liquid crystal cell, i.e., the terahertz wave control element, which is not illustrated, suggesting that there is a possibility that such a degree of deviation actually occurs in the produced liquid crystal cell. However, Re ($n_{para}-n_{perp}$)=±0.16 in the homogeneous alignment cell, and the effective birefringence of the produced cell is a value of about 20%, suggesting that the effective birefringence can be controlled by using the sub-wavelength lattice structure, and that the effective birefringence can be set to 0 by appropriately selecting F.

FIG. 7 illustrates measurement results and calculation results of a phase shift of the terahertz wave control element obtained by this example when a sufficiently large voltage is applied. The phase shift was defined as a difference between the phase of the cell when no voltage was applied and the phase of the cell when a voltage was applied. The voltage was a rectangular wave having a frequency of 1 kHz and an amplitude of 5 V. In the measurement results, the polarization dependence of the phase shift was small, and the shift amount was similar to the calculation results. Furthermore, in the calculation, the refractive index of the liquid crystal when a voltage was applied was set to $n_o$ regardless of the polarization. It was demonstrated from these results that the terahertz wave control element of the present invention can realize the polarization-independent phase shift by using the sub-wavelength liquid crystal lattice structure.

What is claimed is:

1. A terahertz wave control element comprising:
   (A) a first flat plate comprising:
   (A1) a first substrate capable of transmitting a terahertz wave;
   (A2) a first electrode capable of transmitting a terahertz wave, formed on the first substrate; and
   (A3) a first liquid crystal alignment film capable of transmitting a terahertz wave, formed on the first electrode;
   (B) a second flat plate comprising:
   (B1) a second substrate capable of transmitting a terahertz wave;
   (B2) a second electrode capable of transmitting a terahertz wave, formed on the second substrate; and
   (B3) a second liquid crystal alignment film capable of transmitting a terahertz wave, formed on the second electrode; and
   (C) a liquid crystal located in a space formed by locating the (A) first flat plate and the (B) second flat plate to be parallel to each other with a predetermined distance therebetween so that the first and second liquid crystal alignment films are located to be opposite each other,
   wherein (D1) when no voltage is applied, the terahertz wave control element has a first portion in which the liquid crystal is aligned in a first direction parallel to the (A) first flat plate and the (B) second flat plate, and a second portion in which the liquid crystal is aligned in a second direction orthogonal to the first direction and parallel to the (A) first flat plate and the (B) second flat plate,
   (D2) the first portion has a first width, the second portion has a second width, and the first and second portions are disposed adjacent to each other and alternately disposed in a predetermined cycle,
   (D3) when a voltage is applied, the liquid crystal in each of the first portion and the second portion is aligned in a direction orthogonal to the (A) first flat plate and the (B) second plate, and
   (E) a terahertz wave transmitted through the terahertz wave control element results in a phase change independent on a state of polarization.

2. The terahertz wave control element according to claim 1, wherein the first direction has a direction parallel to a width direction of the first width.

3. The terahertz wave control element according to claim 2, wherein a ratio of the first width w1 to the predetermined cycle $\Lambda$, w1/$\Lambda$, is from 0.45 to 0.55.

4. The terahertz wave control element according to claim 1, wherein the predetermined distance d, with which the (A) first flat plate and the (B) second flat plate are located, is from 0.1 mm to 2.0 mm.

5. The terahertz wave control element according to claim 1, wherein each of the first and second liquid crystal alignment films is independently comprised of a photoreactive polymer having a photoreactive side chain that causes at least one reaction selected from the group consisting of (A-1) photocrosslinking and (A-2) photoisomerization.

6. The terahertz wave control element according to claim 5, wherein the photoreactive polymer comprises any one photoreactive side chain selected from the group consisting of the following formulae (1) to (6):

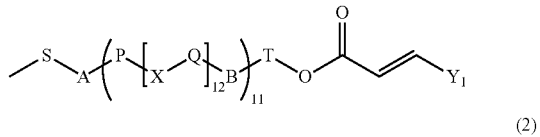

(1)

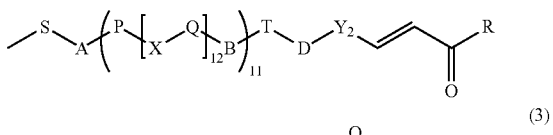

(2)

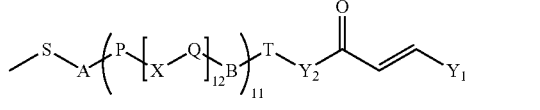

(3)

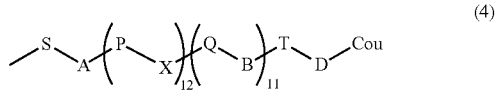

(4)

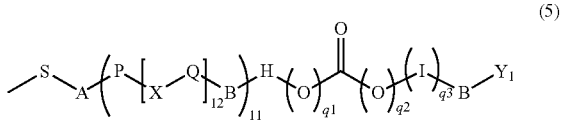

(5)

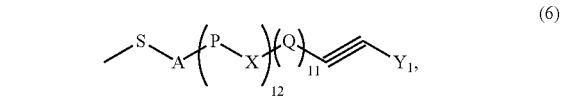

(6)

wherein A, B, and D each independently represents a single bond, —O—, —CH$_2$—, —COO—, —OCO—, —CONH—, —NH—CO—, —CH=CH—CO—O—, or —O—CO—CH=CH—;
S represents an alkylene group having 1 to 12 carbon atoms, wherein a hydrogen atom bonded thereto may be replaced with a halogen group;
T represents a single bond or an alkylene group having 1 to 12 carbon atoms, wherein a hydrogen atom bonded thereto may be replaced with a halogen group;
$Y_1$ represents a ring selected from a monovalent benzene ring, a monovalent naphthalene ring, a monovalent biphenyl ring, a monovalent furan ring, a monovalent pyrrole ring and a monovalent alicyclic hydrocarbon having 5 to 8 carbon atoms, or a group in which the same or different two to six rings selected therefrom are bonded through a bonding group B, wherein a hydrogen atom bonded thereto may be each independently replaced with —COOR$_0$ (wherein R$_0$ represents a hydrogen atom or an alkyl group having 1 to 5 carbon atoms), —NO$_2$, —CN, —CH=C(CN)$_2$, —CH=CH—CN, a halogen group, an alkyl group having 1 to 5 carbon atoms, or an alkyloxy group having 1 to 5 carbon atoms;

$Y_2$ represents a group selected from the group consisting of a bivalent benzene ring, a bivalent naphthalene ring, a bivalent biphenyl ring, a bivalent furan ring, a bivalent pyrrole ring, a bivalent alicyclic hydrocarbon having 5 to 8 carbon atoms and a combination thereof, wherein a hydrogen atom bonded thereto may be each independently replaced with —NO$_2$, —CN, —CH=C(CN)$_2$, —CH=CH—CN, a halogen group, an alkyl group having 1 to 5 carbon atoms, or an alkyloxy group having 1 to 5 carbon atoms;

R represents a hydroxy group, an alkoxy group having 1 to 6 carbon atoms, or has the same definition as $Y_1$;

X represents a single bond, —COO—, —OCO—, —N=N—, —CH=CH—, —C≡C—, —CH=CH—CO—O—, or —O—CO—CH=CH—, and in a case where the number of X is 2, these Xs may be the same or different;

Cou represents a coumarin-6-yl group or a coumarin-7-yl group, wherein a hydrogen atom bonded thereto may be each independently replaced with —NO$_2$, —CN, —CH=C(CN)$_2$, —CH=CH—CN, a halogen group, an alkyl group having 1 to 5 carbon atoms, or an alkyloxy group having 1 to 5 carbon atoms;

one of q1 and q2 is 1, and another is 0;

q3 is 0 or 1;

P and Q each independently represents a group selected from the group consisting of a bivalent benzene ring, a bivalent naphthalene ring, a bivalent biphenyl ring, a bivalent furan ring, a bivalent pyrrole ring, a bivalent alicyclic hydrocarbon having 5 to 8 carbon atoms and a combination thereof, in proviso that in a case where X is —CH=CH—CO—O— or —O—CO—CH=CH—, P or Q on a side to which —CH=CH— is bonded is an aromatic ring, in a case where the number of P is 2 or more, these Ps may be the same or different, and in a case where the number of Q is 2 or more, these Qs may be the same or different;

l1 represents 0 or 1;

l2 represents an integer of 0 to 2;

in a case where both l1 and l2 are 0 and T is a single bond, A also represents a single bond;

in a case where l1 is 1 and T is a single bond, B also represents a single bond; and H and I each independently represents a group selected from a bivalent benzene ring, a bivalent naphthalene ring, a bivalent biphenyl ring, a bivalent furan ring, a bivalent pyrrole ring and a combination thereof.

7. The terahertz wave control element according to claim 5, wherein the photoreactive polymer comprises any one photoreactive side chain selected from the group consisting of the following formulae (7) to (10):

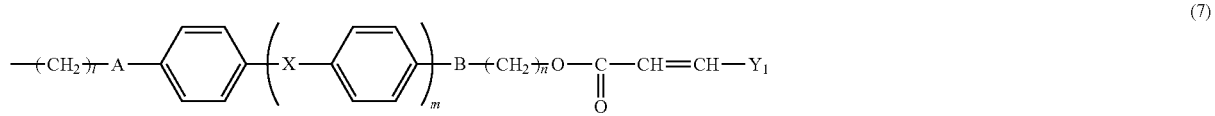

(7)

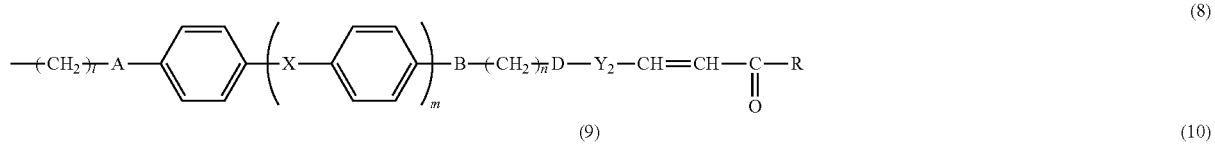

(8)

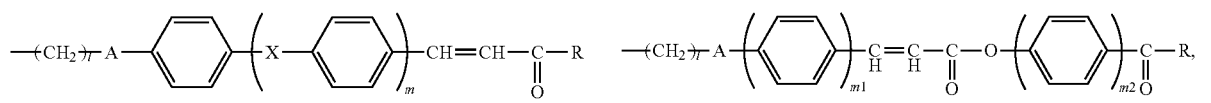

(9)

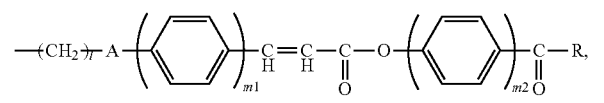

(10)

wherein A, B, and D each independently represents a single bond, —O—, —CH$_2$—, —COO—, —OCO—, —CONH—, —CH=CH—CO—O—, or —O—CO—CH=CH—;

$Y_1$ represents a ring selected from a monovalent benzene ring, a monovalent naphthalene ring, a monovalent biphenyl ring, a monovalent furan ring, a monovalent pyrrole ring and a monovalent alicyclic hydrocarbon having 5 to 8 carbon atoms, or a group in which the same or different two to six rings selected therefrom are bonded through a bonding group B, wherein a hydrogen atom bonded thereto may be each independently replaced with —COOR$_0$ (wherein R$_0$ represents a hydrogen atom or an alkyl group having 1 to 5 carbon atoms), —NO$_2$, —CN, —CH=C(CN)$_2$, —CH=CH—CN, a halogen group, an alkyl group having 1 to 5 carbon atoms, or an alkyloxy group having 1 to 5 carbon atoms;

X represents a single bond, —COO—, —OCO—, —N=N—, —CH=CH—, —C≡C—, —CH=CH—CO—O—, or —O—CO—CH=CH—, and in a case where the number of X is 2, these Xs may be the same or different;

l represents an integer of 1 to 12;

m represents an integer of 0 to 2, and each of m1 and m2 represents an integer of 1 to 3;

n represents an integer of 0 to 12 (when n=0, B represents a single bond);

$Y_2$ represents a group selected from the group consisting of a bivalent benzene ring, a bivalent naphthalene ring, a bivalent biphenyl ring, a bivalent furan ring, a bivalent pyrrole ring, a bivalent alicyclic hydrocarbon having 5 to 8 carbon atoms and a combination thereof, wherein a hydrogen atom bonded thereto may be each independently replaced with —NO$_2$, —CN, —CH=C(CN)$_2$, —CH=CH—CN, a halogen group, an alkyl group having 1 to 5 carbon atoms, or an alkyloxy group having 1 to 5 carbon atoms; and R represents a hydroxy group, an alkoxy group having 1 to 6 carbon atoms, or has the same definition as $Y_1$.

8. The terahertz wave control element according to claim 5, wherein the photoreactive polymer comprises any one photoreactive side chain selected from the group consisting of the following formulae (11) to (13):

(11)

(12)
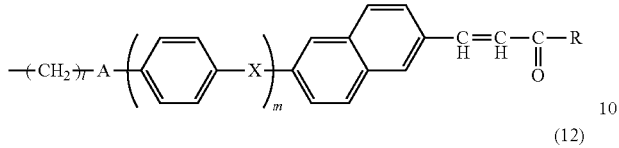

(13)
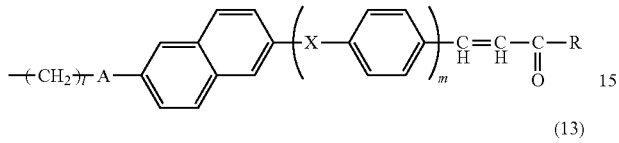

wherein A independently represents a single bond, —O—, —CH$_2$—, —COO—, —OCO—, —CONH—, —NH—CO—, —CH═CH—CO—O—, or —O—CO—CH═CH—;

X represents a single bond, —OCO—, —OCO—, —N═N—, —CH═CH—, —C≡C—, —CH═CH—CO—O—, or —O—CO—CH═CH—, and in a case where the number of X is 2, these Xs may be the same or different;

l represents an integer of 1 to 12, m represents an integer of 0 to 2, and m1 represents an integer of 1 to 3; and R represents a ring selected from a monovalent benzene ring, a monovalent naphthalene ring, a monovalent biphenyl ring, a monovalent furan ring, a monovalent pyrrole ring and a monovalent alicyclic hydrocarbon having 5 to 8 carbon atoms, or a group in which the same or different two to six rings selected therefrom are bonded through a bonding group B, wherein a hydrogen atom bonded thereto may be each independently replaced with —COOR$_0$ (wherein R$_0$ represents a hydrogen atom or an alkyl group having 1 to 5 carbon atoms), —NO$_2$, —CN, —CH═C(CN)$_2$, —CH═CH—CN, a halogen group, an alkyl group having 1 to 5 carbon atoms, or an alkyloxy group having 1 to 5 carbon atoms, a hydroxy group, or an alkoxy group having 1 to 6 carbon atoms.

9. The terahertz wave control element according to claim 5, wherein the photoreactive polymer comprises a photoreactive side chain represented by the following formula (14) or (15):

(14)
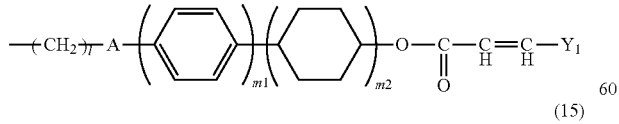

(15)
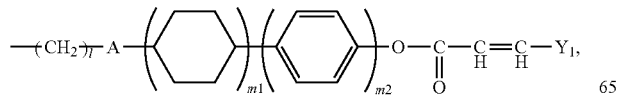

wherein A represents a single bond, —O—, —CH$_2$—, —COO—, —OCO—, —CONH—, —NH—CO—, —CH═CH—CO—O—, or —O—CO—CH═CH—;

Y$_1$ represents a ring selected from a monovalent benzene ring, a monovalent naphthalene ring, a monovalent biphenyl ring, a monovalent furan ring, a monovalent pyrrole ring and a monovalent alicyclic hydrocarbon having 5 to 8 carbon atoms, or a group in which the same or different two to six rings selected therefrom are bonded through a bonding group B, wherein a hydrogen atom bonded thereto may be each independently replaced with —COOR$_0$ (wherein R$_0$ represents a hydrogen atom or an alkyl group having 1 to 5 carbon atoms), —NO$_2$, —CN, —CH═C(CN)$_2$, —CH═CH—CN, a halogen group, an alkyl group having 1 to 5 carbon atoms, or an alkyloxy group having 1 to 5 carbon atoms;

l represents an integer of 1 to 12, and each of m1 and m2 represents an integer of 1 to 3.

10. The terahertz wave control element according to a claim 5, wherein the photoreactive polymer comprises a photoreactive side chain represented by the following formula (16) or (17):

(16)
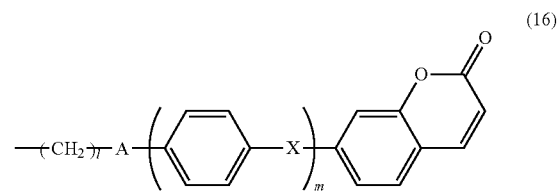

(17)
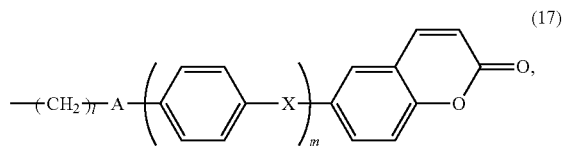

wherein A represents a single bond, —O—, —CH$_2$—, —COO—, —OCO—, —CONH—, —NH—CO—, —CH═CH—CO—O—, or —O—CO—CH═CH—;

X represents a single bond, —COO—, —OCO—, —N═N—, —CH═CH—, —C≡C—, —CH═CH—CO—O—, or —O—CO—CH═CH—, and in a case where the number of X is 2, these Xs may be the same or different; and l represents an integer of 1 to 12, and m represents an integer of 0 to 2.

11. The terahertz wave control element according to claim 5, wherein the photoreactive polymer comprises a photoreactive side chain represented by the following formula (18) or (19):

(18)
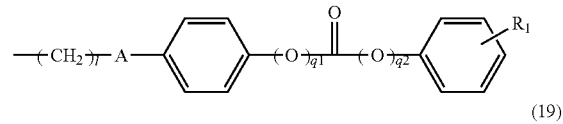

(19)
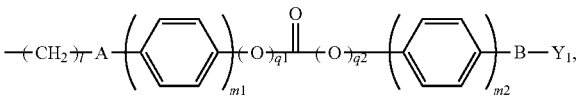

wherein A and B each independently represents a single bond, —O—, —CH$_2$—, —COO—, —OCO—, —CONH—, —NH—CO—, —CH═CH—CO—O—, or —O—CO—CH═CH—;

Y$_1$ represents a ring selected from a monovalent benzene ring, a monovalent naphthalene ring, a monovalent biphenyl ring, a monovalent furan ring, a monovalent pyrrole ring and a monovalent alicyclic hydrocarbon having 5 to 8 carbon atoms, or a group in which the same or different two to six rings selected therefrom are bonded through a bonding group B, wherein a hydrogen atom bonded thereto may be each independently replaced with —COOR$_0$ (wherein R$_0$ represents a hydrogen atom or an alkyl group having 1 to 5 carbon atoms), —NO$_2$, —CN, —CH═C(CN)$_2$, —CH═CH—CN, a halogen group, an alkyl group having 1 to 5 carbon atoms, or an alkyloxy group having 1 to 5 carbon atoms;

one of q1 and q2 is 1, and another is 0;

l represents an integer of 1 to 12, and each of m1 and m2 represents an integer of 1 to 3;

R$_1$ represents a hydrogen atom, —NO$_2$, —CN, —CH═C(CN)$_2$, —CH═CH—CN, a halogen group, an alkyl group having 1 to 5 carbon atoms, or an alkyloxy group having 1 to 5 carbon atoms.

12. The terahertz wave control element according to claim 5, wherein the photoreactive polymer comprises a photoreactive side chain represented by the following formula (20):

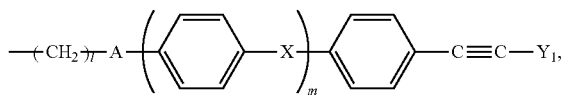

(20)

wherein A represents a single bond, —O—, —CH$_2$—, —COO—, —OCO—, —CONH—, —NH—CO—, —CH═CH—CO—O—, or —O—CO—CH═CH—;

Y$_1$ represents a ring selected from a monovalent benzene ring, a monovalent naphthalene ring, a monovalent biphenyl ring, a monovalent furan ring, a monovalent pyrrole ring and a monovalent alicyclic hydrocarbon having 5 to 8 carbon atoms, or a group in which the same or different two to six rings selected therefrom are bonded through a bonding group B, wherein a hydrogen atom bonded thereto may be each independently replaced with —COOR$_0$ (wherein R$_0$ represents a hydrogen atom or an alkyl group having 1 to 5 carbon atoms), —NO$_2$, —CN, —CH═C(CN)$_2$, —CH═CH—CN, a halogen group, an alkyl group having 1 to 5 carbon atoms, or an alkyloxy group having 1 to 5 carbon atoms;

X represents a single bond, —COO—, —OCO—, —N═N—, —CH═CH—, —C≡C—, —CH═CH—CO—O—, or —O—CO—CH═CH—, and in a case where the number of X is 2, these Xs may be the same or different; and l represents an integer of 1 to 12, and m represents an integer of 0 to 2.

13. A method for producing a terahertz wave control element, comprising the step of:

(I) preparing a first substrate capable of transmitting a terahertz wave, the first substrate having one surface provided with a first electrode capable of transmitting a terahertz wave;

(II) preparing a first liquid crystal aligning agent comprising a photoreactive polymer having a photoreactive side chain that causes at least one reaction selected from the group consisting of (A-1) photocrosslinking and (A-2) photoisomerization;

(III) applying the first liquid crystal aligning agent on the first electrode of the first substrate, to form a first liquid crystal alignment film;

(IV) (i) a 1st light irradiation step: irradiating the first liquid crystal alignment film with a first polarized light through a photomask having a 1st region with a first width that transmits the first polarized light and a second region with a second width that does not transmit the first polarized light alternately in a predetermined cycle, to cause the reaction in the photoreactive polymer in a first portion corresponding to the first region of the first liquid crystal alignment film; and (ii) a 2nd light irradiation step: disposing the photomask so that a second portion different from the first portion in the 1st light irradiation step is formed as a region capable of transmitting a second polarized light orthogonal to the first polarized light, and irradiating the first liquid crystal alignment film with the second polarized light through the photomask to cause the reaction in the photoreactive polymer in the second portion of the first liquid crystal alignment film;

(V) performing heat treatment on the substrate obtained after the 1st and 2nd light irradiation steps, to obtain a first flat plate;

(I') preparing a second substrate capable of transmitting a terahertz wave, the second substrate having one surface provided with a second electrode capable of transmitting a terahertz wave;

(II') preparing a second liquid crystal aligning agent comprising a photoreactive polymer having a photoreactive side chain that causes at least one reaction selected from the group consisting of (A-1) photocrosslinking and (A-2) photoisomerization;

(III') applying the second liquid crystal aligning agent on the second electrode of the second substrate, to form a second liquid crystal alignment film;

(IV') (i') a 1'st light irradiation step: irradiating the second liquid crystal alignment film with a first polarized light through the photomask, to cause the reaction in the photoreactive polymer in a 1'st portion corresponding to the first region of the second liquid crystal alignment film; and (ii) a 2'nd light irradiation step: disposing the photomask so that a 2'nd portion different from the 1'st portion in the 1'st light irradiation step is formed as a region capable of transmitting a second polarized light orthogonal to the first polarized light, and irradiating the second liquid crystal alignment film with the second polarized light through the photomask to cause the reaction in the photoreactive polymer in the 2'nd portion of the second liquid crystal alignment film;

(V') performing heat treatment on the substrate obtained after the 1'st and 2'nd light irradiation steps, to obtain a second flat plate;

(VI) locating the first flat plate and the second flat plate in parallel with a predetermined distance therebetween so that the first and second liquid crystal alignment films are opposite to each other, the 1st portion of the first liquid crystal alignment film and the 1'st portion of the second liquid crystal alignment film are opposite to each other, and the 2nd portion of the first liquid crystal alignment film and the 2'nd portion of the second liquid crystal alignment film are opposite to each other, to provide a space between the first flat plate and the second flat plate; and (VII) filling the space with a liquid crystal;

thereby to obtain the terahertz wave control element.

* * * * *